Sept. 9, 1930.  B. JORGENSEN  1,775,225
LASTING MACHINE
Original Filed Sept. 26, 1925  12 Sheets-Sheet 1

INVENTOR.
Bernhardt Jorgensen
By his Attorney,
Nelson W. Howard

Sept. 9, 1930.  B. JORGENSEN  1,775,225
LASTING MACHINE
Original Filed Sept. 26, 1925  12 Sheets-Sheet 2

Sept. 9, 1930.                B. JORGENSEN                1,775,225
                              LASTING MACHINE Original Filed Sept. 26, 1925    12 Sheets-Sheet 3

INVENTOR
Bernhardt Jorgensen
By his Attorney
Nelson W. Howard

Sept. 9, 1930. B. JORGENSEN 1,775,225
LASTING MACHINE
Original Filed Sept. 26, 1925 12 Sheets-Sheet 4
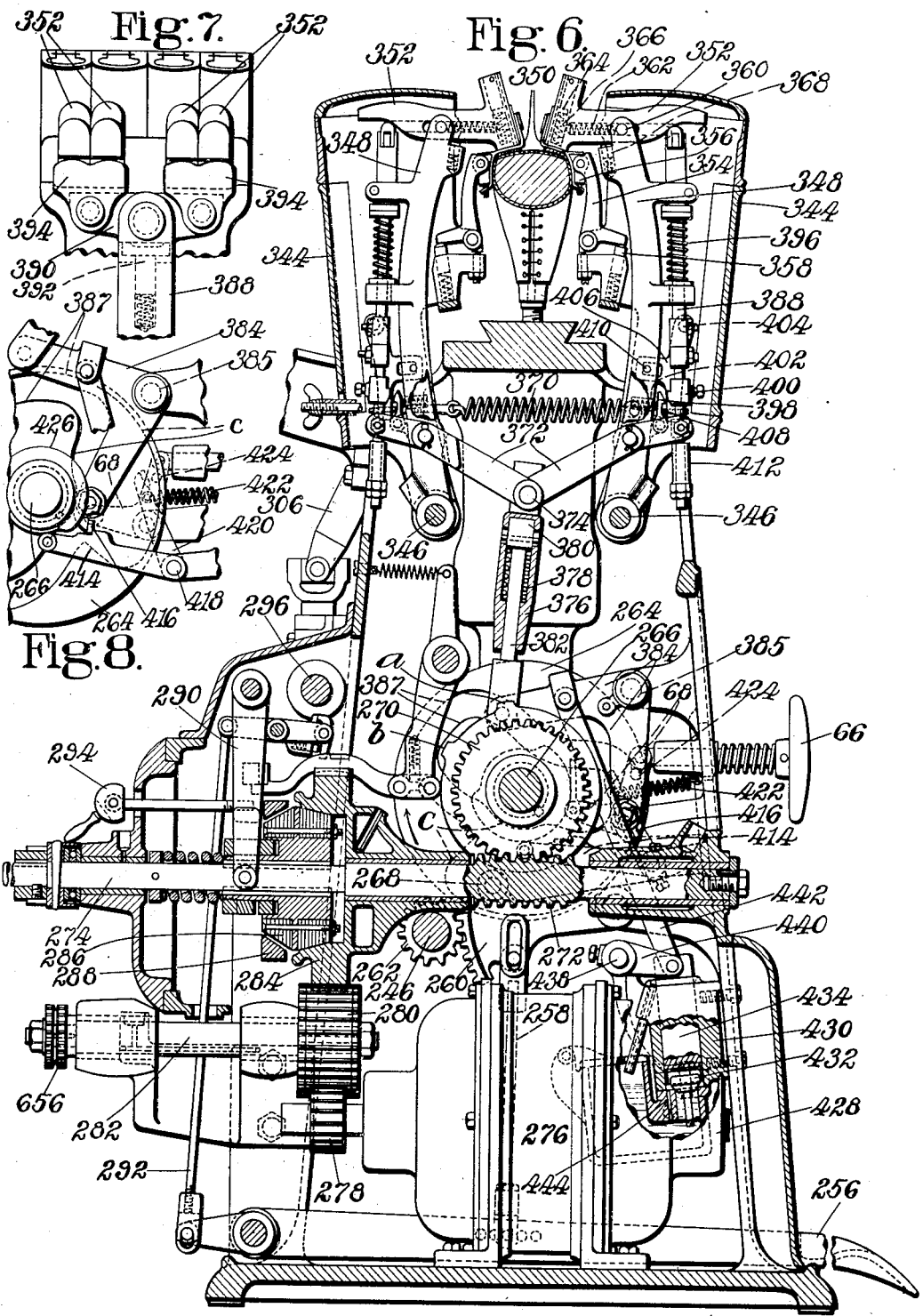
INVENTOR.
Bernhardt Jorgensen
By his Attorney
Nelson W. Howard

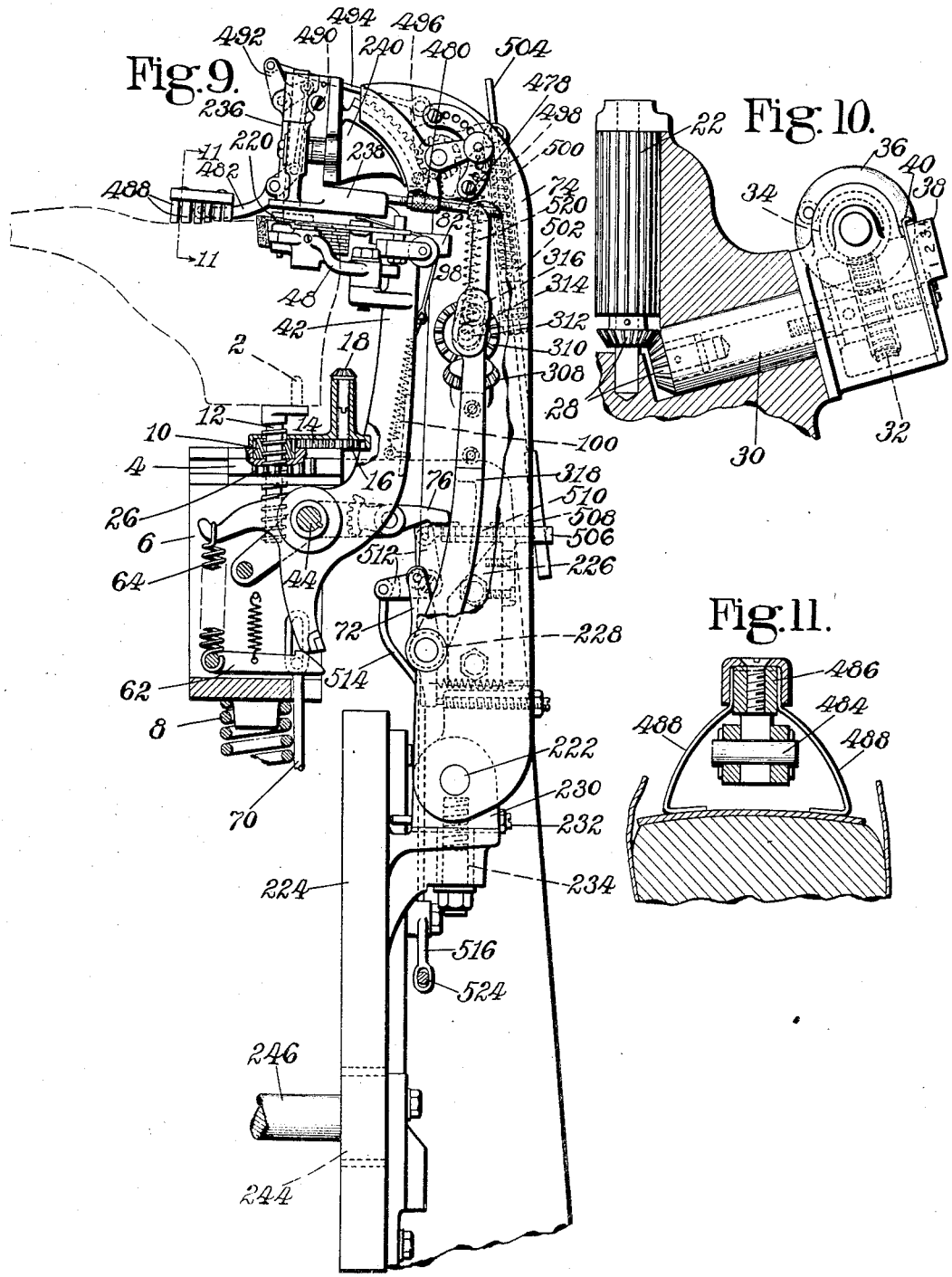

Sept. 9, 1930.  B. JORGENSEN  1,775,225
LASTING MACHINE
Original Filed Sept. 26, 1925  12 Sheets-Sheet 6
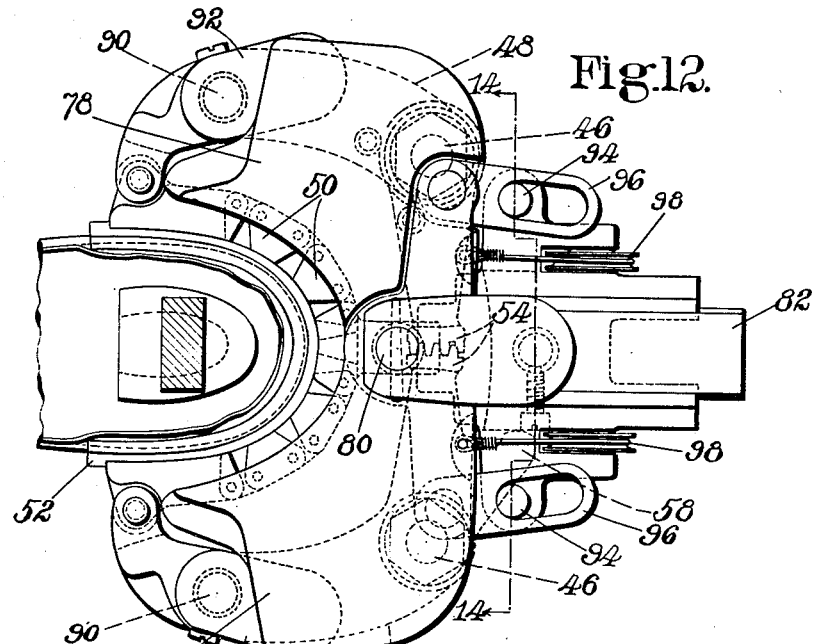
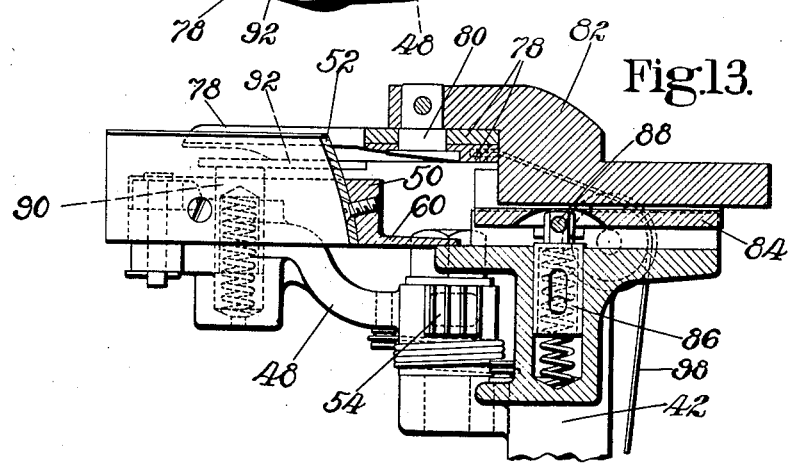
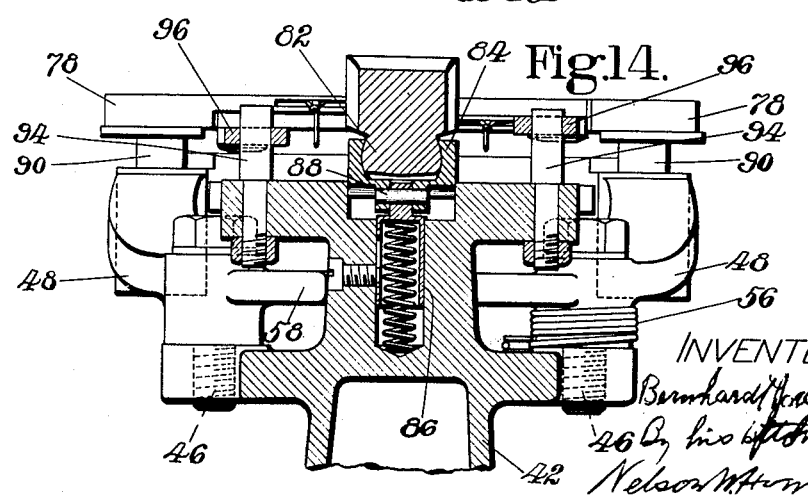

Sept. 9, 1930.   B. JORGENSEN   1,775,225
LASTING MACHINE
Original Filed Sept. 26, 1925   12 Sheets-Sheet 7
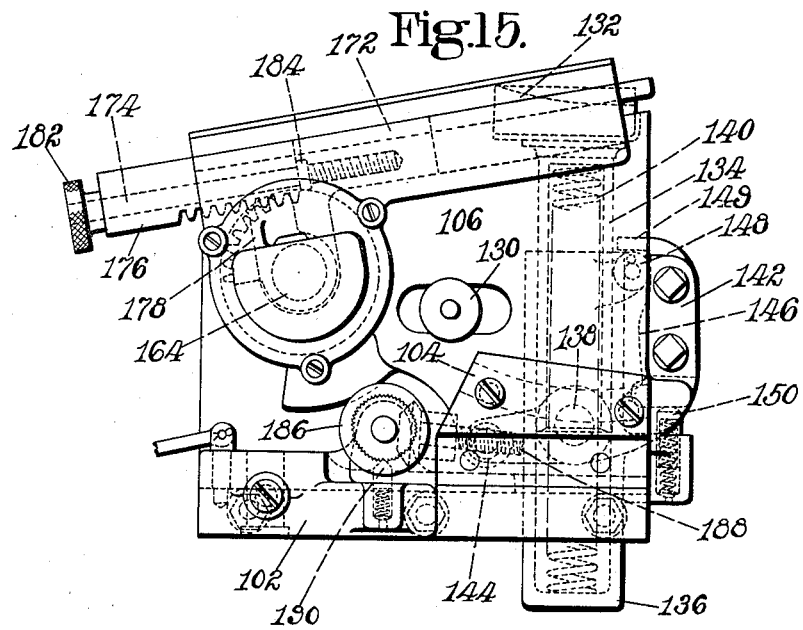
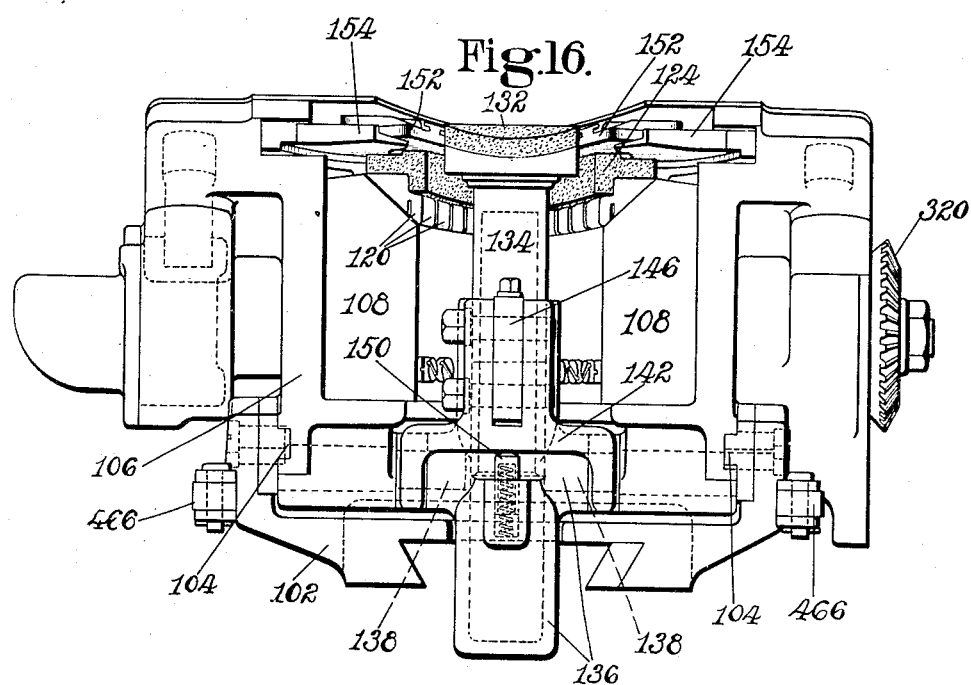

Sept. 9, 1930. B. JORGENSEN 1,775,225
LASTING MACHINE
Original Filed Sept. 26, 1925  12 Sheets-Sheet 8
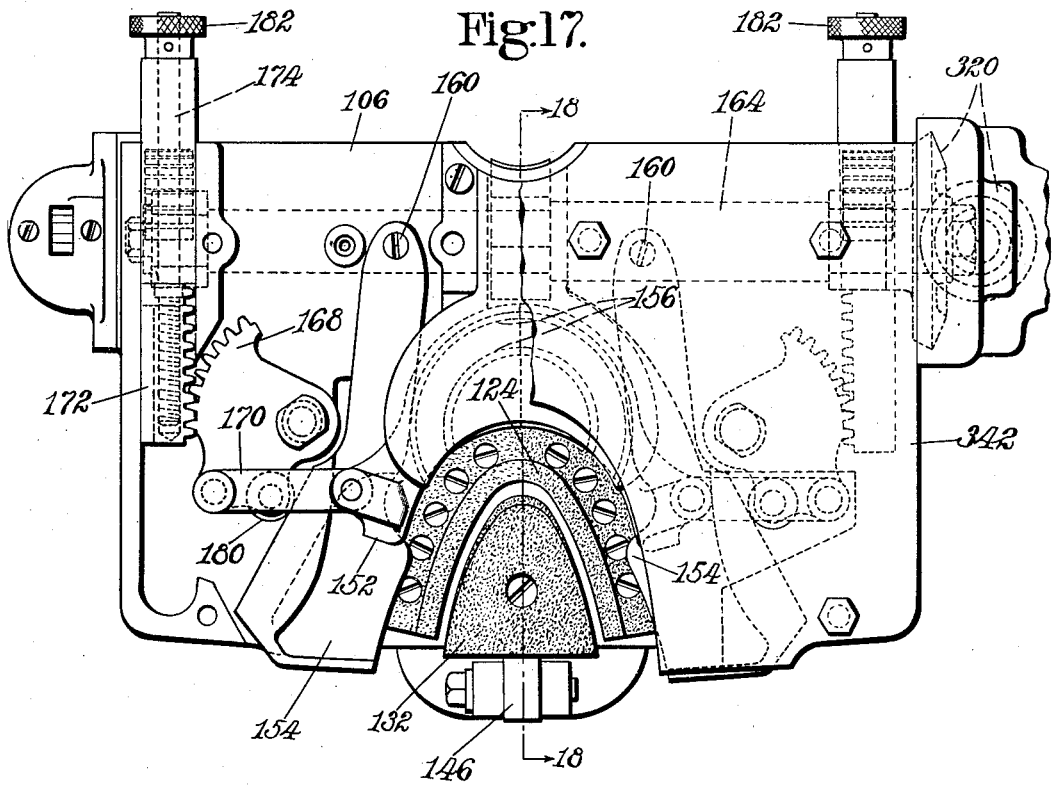
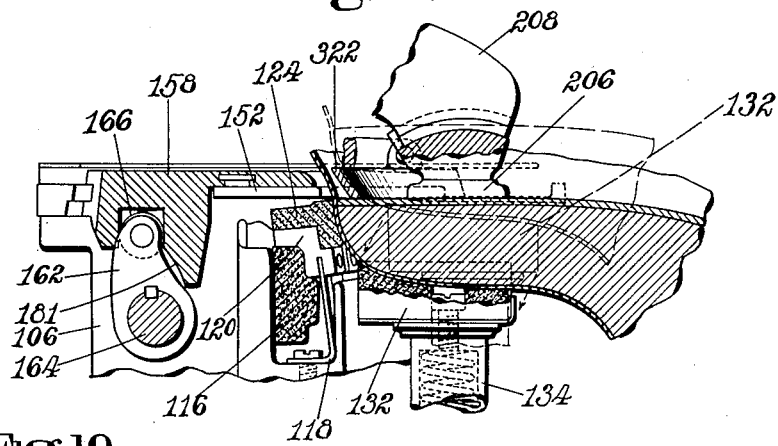
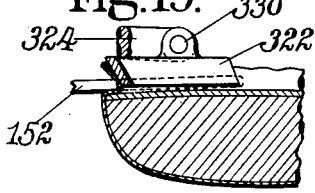
INVENTOR.
Bernhardt Jorgensen
By his Attorney
Nelson W. Howard Sept. 9, 1930.   B. JORGENSEN   1,775,225
LASTING MACHINE
Original Filed Sept. 26, 1925   12 Sheets-Sheet 9
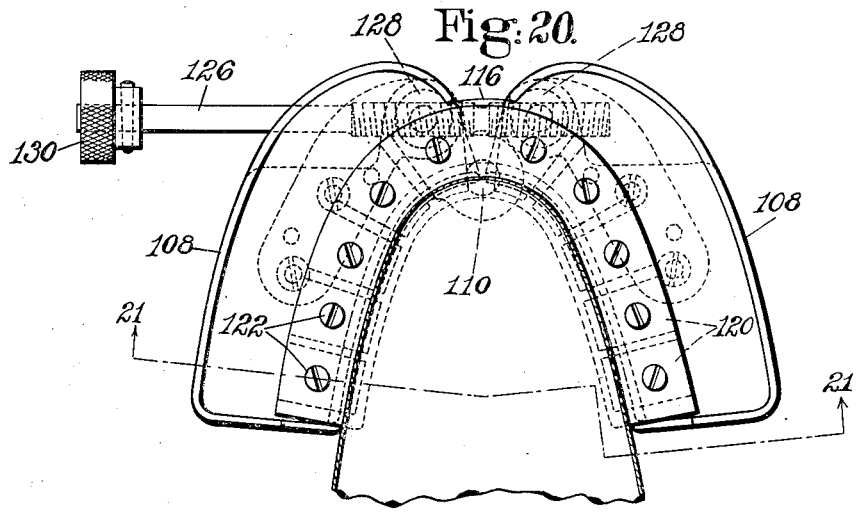
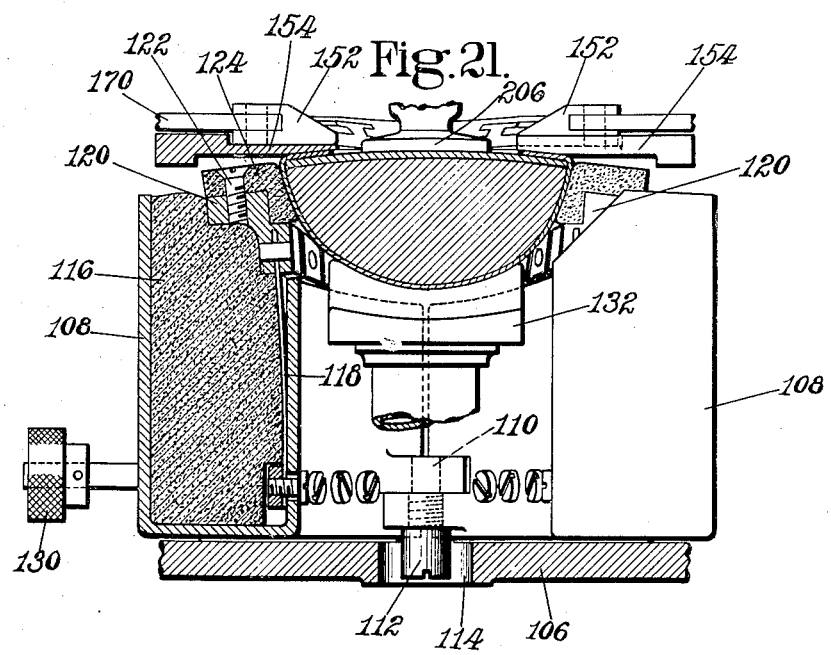

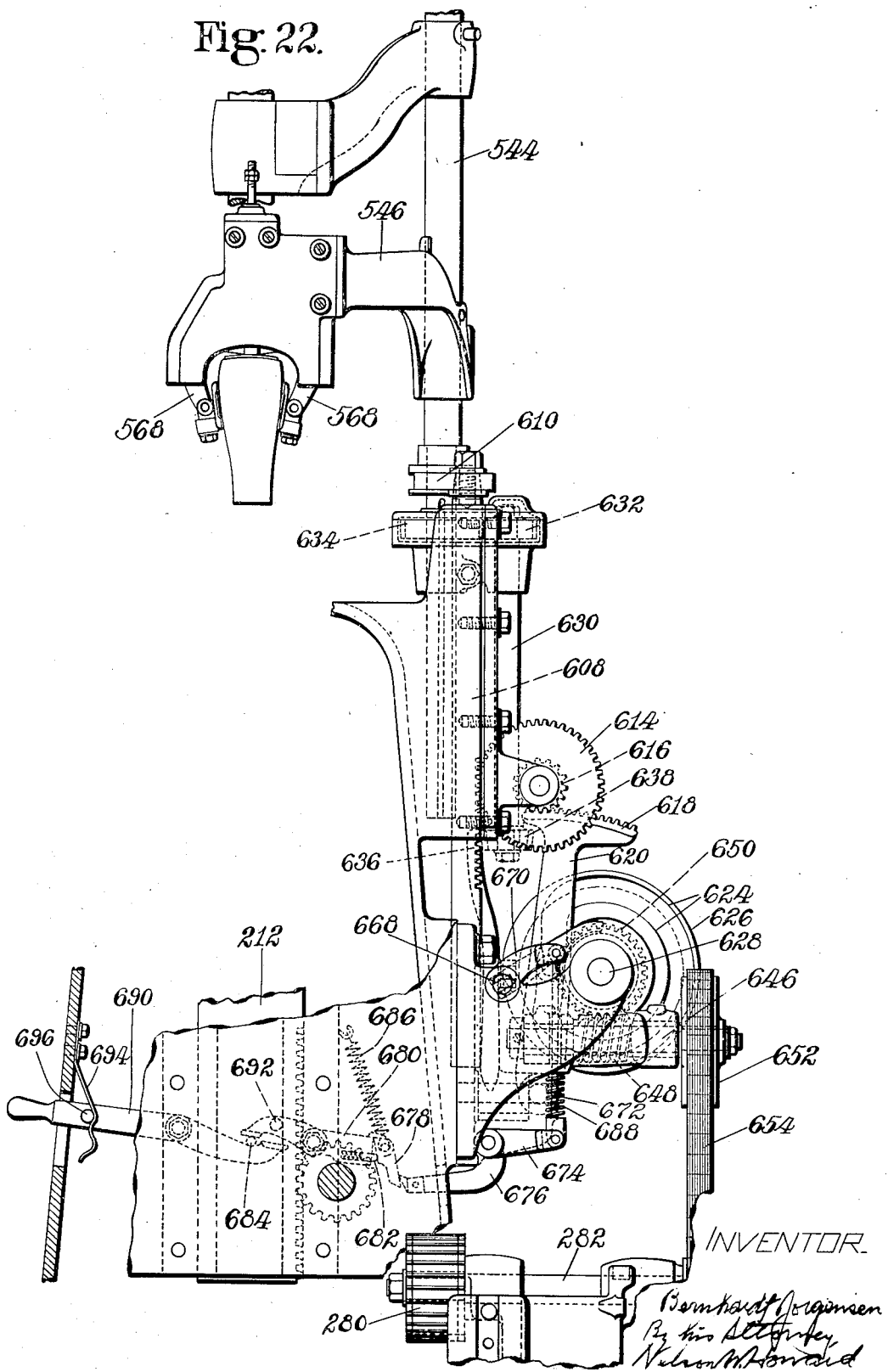

Sept. 9, 1930.  B. JORGENSEN  1,775,225
LASTING MACHINE
Original Filed Sept. 26, 1925  12 Sheets-Sheet 11
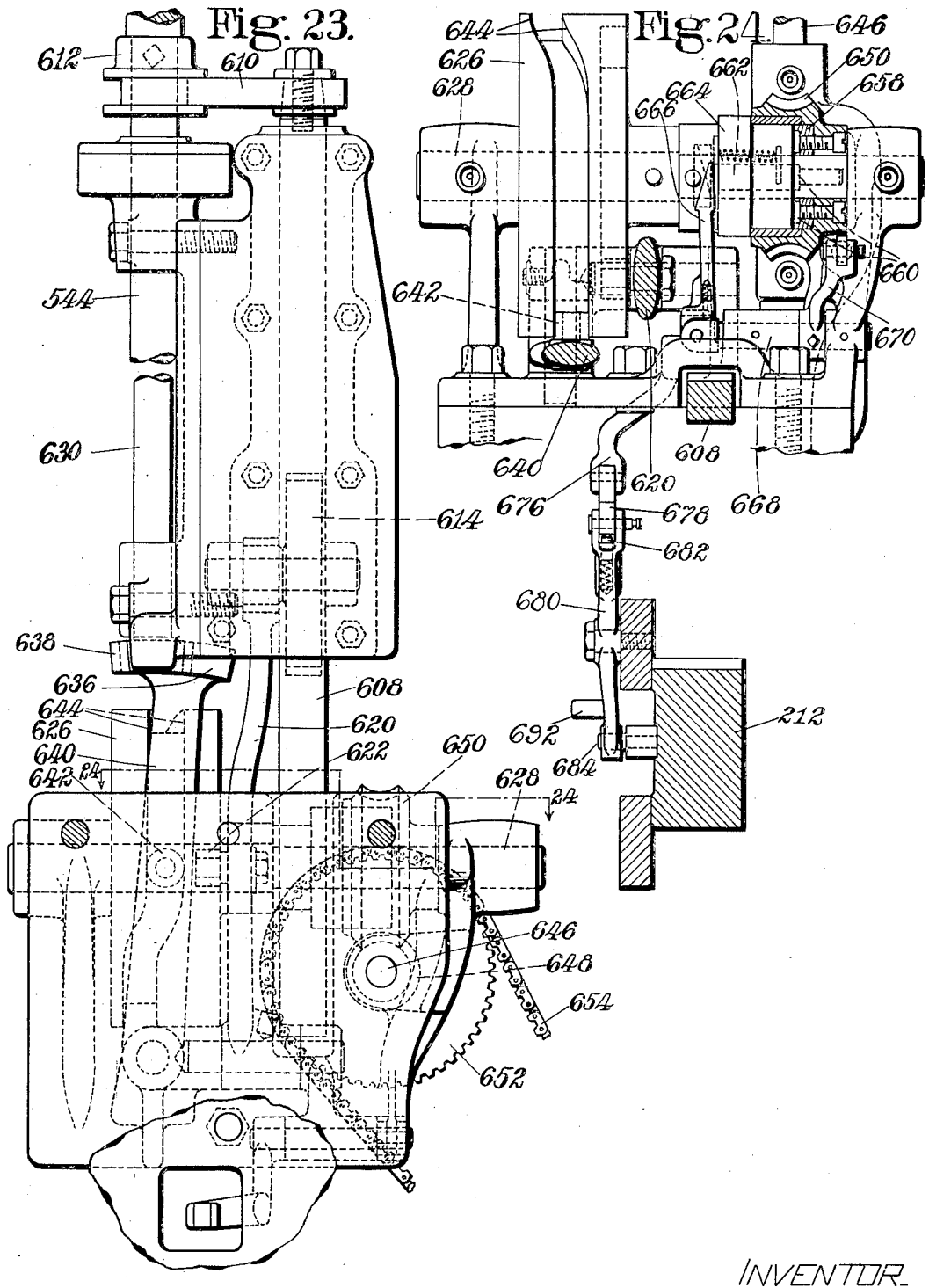

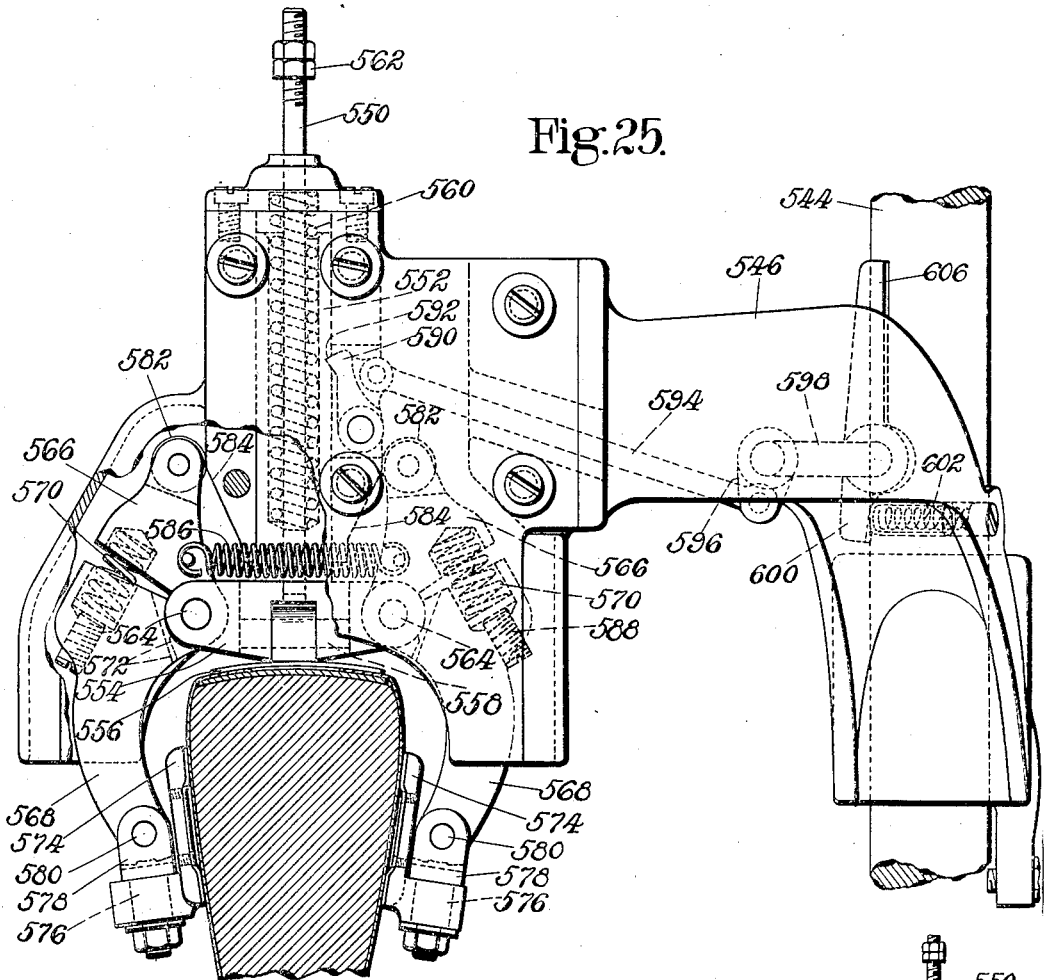
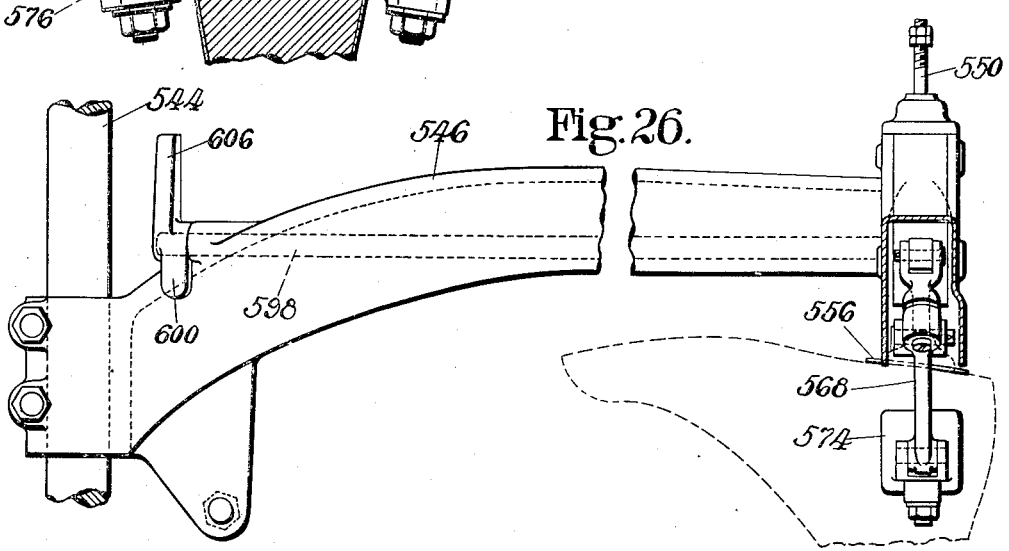

Patented Sept. 9, 1930

1,775,225

UNITED STATES PATENT OFFICE

BERNHARDT JORGENSEN, OF BEVERLY, MASSACHUSETTS, ASSIGNOR TO UNITED SHOE MACHINERY CORPORATION, OF PATERSON, NEW JERSEY, A CORPORATION OF NEW JERSEY

LASTING MACHINE

Application filed September 26, 1925, Serial No. 58,944. Renewed August 21, 1929.

This invention relates to machines for use in the manufacture of shoes, and in many of its aspects has more particular reference to machines for lasting shoes. The invention is herein illustrated in its application to a machine for lasting tennis shoes or sneakers, comprising an organization of the same general type as that shown and described in Letters Patent No. 1,722,499 granted upon an earlier application of mine on July 30, 1929. It will be understood, however, that in various aspects the invention is not limited to machines of that particular type.

One object of the present invention is to provide improved means for laying the margin of the upper inwardly over the insole and for pressing it upon the insole. In the illustrative application of this part of the invention to side-lasting mechanism comprising flexible straps and members operating through said straps to lay the upper inwardly over the insole, the machine herein shown is provided with means for imparting upper-pressing movement to said members, the construction illustrated comprising spring mechanism which is tripped automatically after said members have been moved inwardly over the insole to swing them downwardly toward the insole. In this manner there is applied to the margin of the upper such pressure as to insure that, in work of the type illustrated, it will be firmly fastened to the insole by the acting of cement. The machine herein shown further comprises a novel construction and arrangement of means for controlling the lasting straps, with the particular object of holding them taut during their action on the shoe.

Machines of the type shown in the above-mentioned Letters Patent comprise opposite side-lasting mechanisms which are moved inwardly into engagement with the sides of the shoe to render them effective on the shoe, and also means for clamping on the bottom of the last an insole which is loose on the last. The present invention further provides an organization in which the opposite side-lasting mechanisms are moved inwardly toward or into engagement with the shoe prior to the clamping of the insole, so as to avoid danger of relative displacement of the last and the insole by the engagement of these mechanisms with the sides of the shoe after the insole has been clamped in proper position. In the construction shown manually controlled spring means is provided for moving the opposite side-lasting mechanisms into engagement with the shoe prior to the starting of the power operation of the machine, and in order further to avoid danger of objectionable lateral displacement of the shoe by abrupt engagement of the side-lasting mechanisms therewith, there is also provided means for retarding the movement of said mechanisms toward the shoe.

Various novel features are also to be recognized in the means provided for lasting the forepart of the shoe. Among these features are a novel organization of means for working the upper over the toe of the last and means for working it forwardly by engagement therewith at the top of the forepart of the shoe, and also a novel construction of means for thus working the upper forwardly in response to movement of the shoe in the direction of its height. The machine herein shown is further provided with novel end-clamping or upwiping mechanism comprising a flexible band and means for supporting it substantially against yield heightwise of the shoe while permitting it to yield outwardly in response to pressure of the shoe thereon. For the purpose in view the construction illustrated comprises spring metal members for supporting the flexible band against yield heightwise of the shoe, with a rubber backing against which said members are yieldable outwardly from the shoe. Still other features reside in a novel construction of wipers for laying the margin of the upper inwardly over the insole without objectionable deflection of the upper at the sides of the end of the shoe in the direction of the length of the shoe, in a novel construction of wiper-operating means, and in a novel organization including a device adapted, as herein illustrated, to position the toe end of the insole close to the bottom of the last and also to serve as a "retarder" in engagement with the margin of the upper to increase the pressure of the toe wipers on the upper while being forced away from the insole by the action of the wipers.

In combination with means for lasting the opposite sides of the shoe, the invention further provides means for controlling the insole to position it close to the bottom of the last preparatory to the laying of the margin of the upper inwardly thereover. It is particularly important thus to control the shank portion of the insole, and the machine herein shown is accordingly provided with a holddown device which is movable into and out of position to engage the opposite side portions of an insole in the shank, together with automatic means for withdrawing said device from operative position in time relation to the operation of the side-lasting mechanisms. Preferably the machine is timed to effect the withdrawal of said device after the side-lasting mechanisms have begun to lay the upper over the margin of the insole, and in order to avoid objectionable interference between said mechanisms and the holddown device, the latter comprises members which are yieldable laterally of the shoe in response to pressure of the side-lasting mechanisms thereon.

Still another important feature of the invention resides in the provision, in a machine for operating on shoes, of means for removing a shoe from operating position or from the machine. In the construction shown there is provided mechanism which acts automatically, after the lasting of each shoe, to seize the shoe and remove it from the shoe support and then to release it so that it falls into a receptacle provided to receive it. The operator is thus left free to prepare another shoe for presentation to the machine while the operations on the preceding shoe are being completed, and is enabled to mount the second shoe on the shoe support immediately upon the removal of the first shoe. This contributes materially to rapid work and to a high output from the machine.

The above and other features of the invention, including various details of construction and combinations of parts, will now be more particularly described by reference to the accompanying drawings and pointed out in the claims.

In the drawings:

Fig. 6 is a vertical section of the machine in a plane transverse to that of Fig. 5;

Fig. 7 shows in elevation a portion of one of the opposite side-lasting mechanisms;

Fig. 8 is a detail view showing certain parts that appear on Fig. 6 in a different position;

Fig. 9 is a view in front elevation, with parts broken away, showing the heel end lasting means and the shoe support and heel band;

Fig. 10 is a detail view of means provided for adjusting the shoe support lengthwise of the shoe;

Fig. 11 is a section on the line 11—11 of Fig. 9;

Fig. 12 is a plan view of the heel wipers and associated parts;

Fig. 13 is a vertical section longitudinally of the structure shown in Fig. 12;

Fig. 14 is a section on the line 14—14 of Fig. 12;

Fig. 15 is a view in front elevation of the toe-lasting mechanism;

Fig. 16 is a right-hand end elevation of the mechanism shown in Fig. 15;

Fig. 17 is a plan view of the toe-lasting mechanism, with parts broken away;

Fig. 18 is a vertical section on the line 18—18 of Fig. 17, showing the parts as positioned at an intermediate stage in the toe-lasting operation;

Fig. 19 is a view of certain parts shown in Fig. 18, at a later stage in the lasting operation;

Fig. 20 is a plan view of means provided for upwiping the upper about the toe;

Fig. 21 is a section on the line 21—21 of Fig. 20;

Fig. 22 is a view in right-hand end elevation of the shoe-removing mechanism;

Fig. 23 is a view in front elevation of the lower portion of the mechanism shown in Fig. 22;

Fig. 24 is a section on the line 24—24 of Fig. 23;

Fig. 25 is a view in elevation, with parts broken away, showing the upper portion of the shoe-removing mechanism, and Fig. 26 is a view of the parts shown in Fig. 25 from a different angle.

Figure 1:
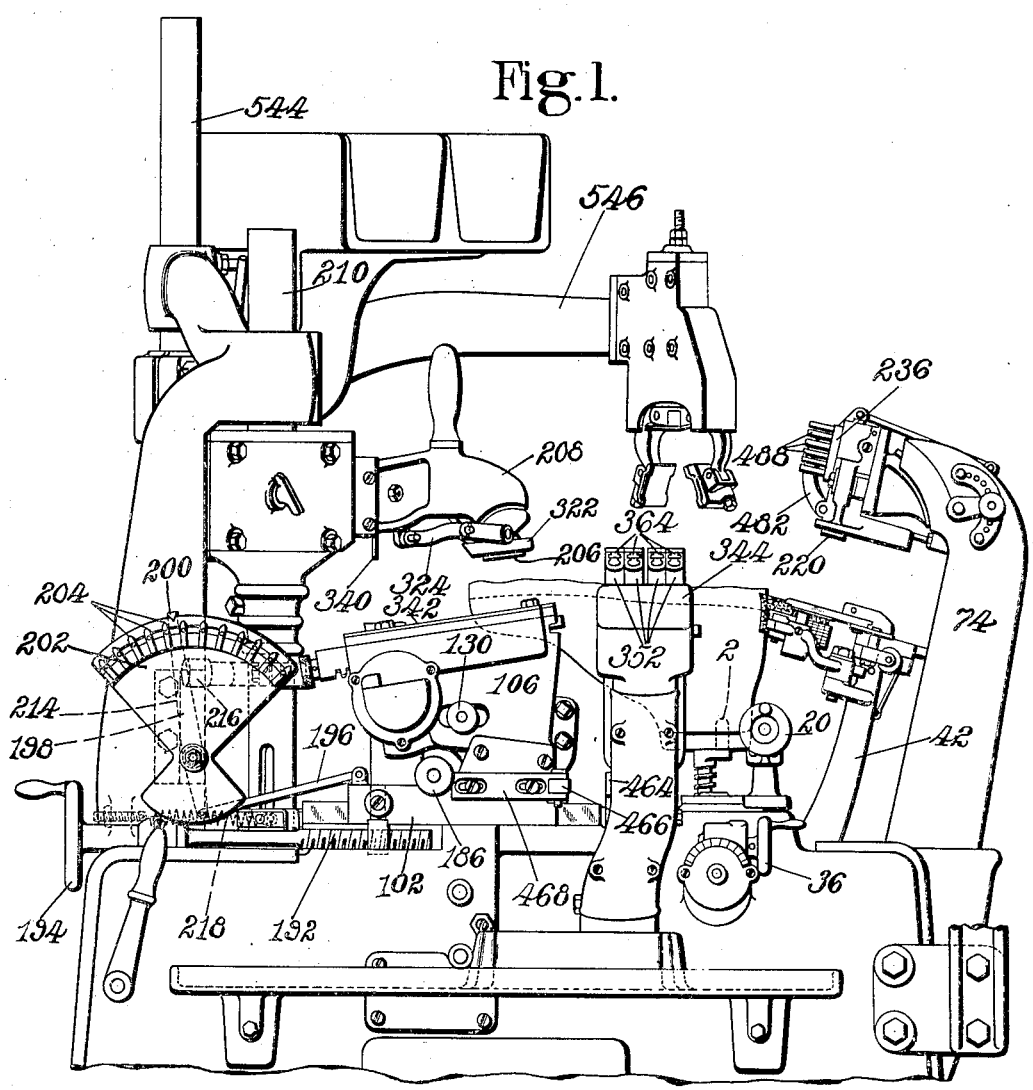
Fig. 1 is a view in front elevation of the upper portion of a machine in which the invention is embodied.
Figure 2:
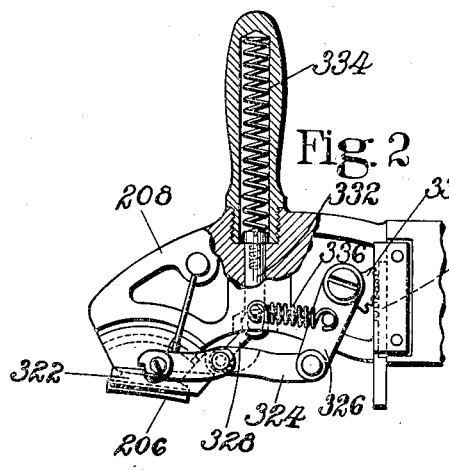
Fig. 2 is a view in rear elevation, with parts in section, of a toe depressor and retarding device shown in Fig. 1.
Figure 3:
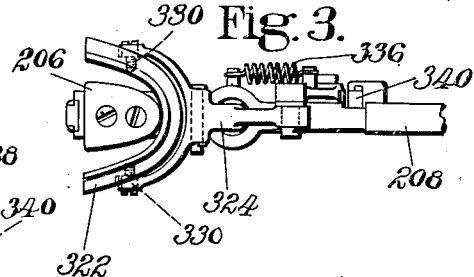
Fig. 3 is an inverted plan view of the parts shown in Fig. 2.
Figure 4:
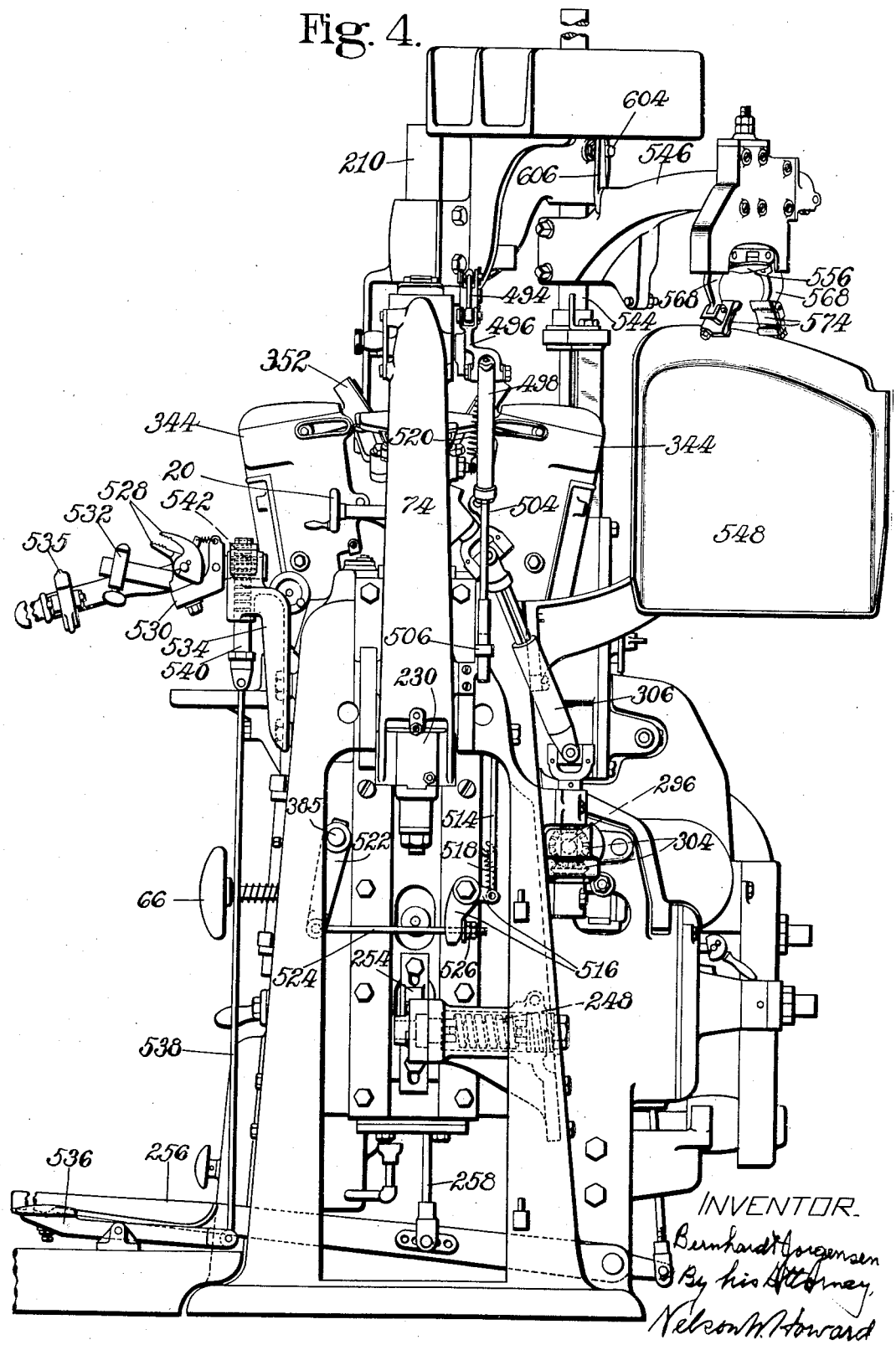
Fig. 4 is a view of the machine in right-hand end elevation.

The last with its shoe materials is supported upon a heel pin 2 which is carried by a slide 4 (Fig. 9) mounted for movement lengthwise of the shoe in the upper end of a vertically movable supporting slide 6 which is depressible against the resistance of a spring 8. The heel pin 2 is vertically adjustable in the slide 4 by means of a pinion 10 which is threaded on a stem 12 that extends downward from the pin, the pinion 10 being connected by an idle pinion 14 to a pinion 16 which is operated through beveled gearing 18 from a hand wheel 20 (Figs. 1 and 4). The slide 4 which supports the heel pin 2 is adjustable lengthwise of the shoe on the slide 6 by means of a vertically elongated pinion 22 (Fig. 10) which is connected by means of an idle pinion 24 (Fig. 5) to rack teeth 26 on the slide 4. The pinion 22 is mounted on the frame of the machine, and by reason of its length is continuously in engagement with the pinion 24 whatever may be the vertical position of the slide 6. The pinion 22 is operated through beveled gearing 28 by a shaft 30 which is connected by worm gearing 32, 34 to a hand wheel 36. Mounted to turn with the gear 32 is a segment 38 provided with size graduations arranged to co-operate with a pointer 40 to indicate the proper adjustment of the heel pin for different sizes of shoes.

For clamping the upper about the heel end of the last there is provided on arm 42 (Fig. 9) which is fast on a rock shaft 44 mounted to turn in bearings in the slide 6, and mounted on pivot studs 46 upon the upper end of the arm 42 are arms 48 (Figs. 12, 13 and 14) which support at their front ends the opposite ends of a heel band comprising a chain of connected links 50 provided with a leather facing 52. At their rear ends the arms 48 are provided with intermeshing gear sectors 54 which insure that the arms will swing in unison, and connected to one of the arms is a spring 56 (Fig. 14) which tends to swing both arms outwardly and thus to open the heel band while permitting the band to close about the heel end of a shoe in response to pressure of the end face of the shoe against it. An extension 58 on one of the arms 48 acts as a stop in engagement with a portion of the arm 42 to limit opening of the heel band. At its intermediate portion the chain 50 is provided with an extension 60 which rests on a shelf formed on the arm 42 to assist in supporting the band.

Initially the arm 42 and the heel band are held in the idle position illustrated in Fig. 1 by means of a latch 62 (Fig. 9) on the slide 6 in engagement with a downward extension of the arm 42. When the latch 62 is moved downward to release the arm 42, the latter is swung toward the shoe by means of a spring 64 to apply the heel band about the end of the shoe. The latch 62 is thus moved downwardly by the operator, prior to the starting of the machine, through the operation of a knee plunger 66 (Fig. 6) connected by a bell-crank 68 to a rod 70 which acts on the latch 62, the rod having a slotted upper end to permit downward movement of the slide 6 and the parts supported thereby in the operation of the machine. After the operation of the machine upon the shoe the arm 42 and the parts supported thereby are returned to idle position by mechanism substantially as shown and described in the earlier Letters Patent, comprising a member 72 which is carried by an upwardly and downwardly movable arm 74 hereinafter more particularly referred to, the member 72 acting in the upward movement of the arm 74 upon an arm 76 connected by gearing to the arm 42 to swing the latter into position to be held by the latch 62.

In addition to the heel band, the arm 42 carries heel-lasting wipers 78 which are mounted to swing about a pivot stud 80 on a slide 82 which is movable lengthwise of the shoe in an elongated slideway formed in a member 84 supported on a vertically movable spring plunger 86 in the arm 42. In the construction herein shown the member 84 is connected to the plunger 86 by a pivot stud 88 which permits the wipers 78 to tip lengthwise of the shoe in conformity to the contour of the heel seat. By reference to Fig. 14 it will be seen that the slideway in the member 84 and that portion of the slide 82 which is within the slideway are so shaped as to permit the wipers to tip also laterally of the shoe in conformity to the contour of the heel seat. For controlling the lateral tipping of the wipers 78 there are provided spring plungers 90 in the arms 48 having at their upper ends plates 92 which underlie the wipers, the latter having their front ends recessed to avoid interference with the side-lasting mechanisms hereinafter described. It will be understood that by the spring plungers 86 and 90 the wipers are thus supported initially in a higher plane than their operating plane, and they are depressed by mechanism engaging them from above, as more particularly hereinafter described.

The wipers are advanced lengthwise of the shoe by forward movement of the slide 82 effected by mechanism also more particularly hereinafter referred to, and as they are thus advanced they are closed laterally of the shoe by the action of pins 94 which are fast on the arm 42 and project within slots formed in links 96. These links are pivotally connected to extensions of the wipers 78 which overlap and project oppositely across the longitudinal median line of the wiper mechanism. It will be evident that in the construction shown the closing movement of the wipers laterally of the shoe does not begin until they have been advanced lengthwise of the shoe far enough for the pins 94 to engage the links 96 at the outer ends of the slots formed in the links, the purpose of this construction being to prevent the wipers from closing inwardly over the sides of the heel seat ahead of their advance over the end of the heel seat. For retracting the wipers with the slide 82 as far as permitted by the pins 94, and for opening the wipers, the latter are connected by cords 98 to a spring 100 (Fig. 9) the lower end of which is connected to the arm 42. In the construction shown the wipers 78 do not act directly upon the upper materials, but upon an upward extension of the leather facing 52 of the heel band which is thus interposed between the upper and the wipers so that the action of the wipers is to lay the upper over the insole without frictional contact therewith.

The toe-lasting mechanism, shown in Fig. 1 and more in detail in Figs. 15 to 21, inclusive, comprises means for working the upper forwardly on the last, means for wiping it upwardly about the toe to the edge of the insole, and means for wiping its margin inwardly over the insole and for pressing it into position to adhere to the insole. Guided on the frame of the machine for adjusting movement lengthwise of the shoe is a slide 102 which has fast thereon at its opposite sides curved guiding members 104 upon which there is mounted for adjustment a casing or support 106. Mounted within a recess in the casing 106 are two metal boxes or holders 108, which rest upon a shelf in the casing and are hinged together by means of a pivot stud 110 provided with a head 112 which is loosely mounted in a recess 114 in the shelf. Within the boxes 108 is a block of soft rubber 116 which extends continuously across from one box to the other above the hinge joint connecting the boxes, as illustrated in Fig. 18. Secured at their lower ends to the boxes 108 are a plurality of leaf springs 118 which have fast on their upper ends metal blocks 120, two of these springs, adjacent to the hinge joint connecting the boxes, being shorter than the others, as shown in Fig. 18. Secured by screws 122 to the blocks 120 is a strip of rubber 124 which is arranged to extend continuously about the toe of the shoe to serve as a toe band. When the shoe is depressed, as hereinafter described, the band 124 thus serves as means to wipe the upper upwardly about the toe to the edge of the insole. In this upwiping operation the blocks 120 which support the band 124 may yield outwardly, independently of one another, against the resistance of their supporting springs 118 and against the further resistance of the rubber block 116 which serves as a backing for the springs. It will be evident that in this operation the springs 118 serve to prevent the band 124 from yielding unduly in a downward direction with the shoe and thus render it effective to wipe or draw the upper upwardly in the manner required.

In the upwiping operation above described the boxes 108, which carry the upwiping member 124, are free by reason of the recess 114 to shift more or less as a unit laterally and lengthwise of the shoe in the casing 106 in response to pressure of the shoe on the member 124 and thus to adjust themselves to the position of the toe end of the shoe. In order to adjust the upwiping means to shoes of different widths, there is provided a screw 126 having right and left threads in engagement with studs 128 which are swiveled in the bottoms of the boxes 108, this screw having a knurled head 130 and projecting outwardly through a slot in the casing 106 which is sufficiently wide to permit shifting movement of the boxes 108 as above described. It will be seen that by turning the screw 126 the boxes 108 are adjusted about the axis of their pivot stud 110 toward or from each other.

The machine is further provided with means which acts during the upwiping operation to work the upper forwardly on the last by engagement therewith at the top of the forepart, this means comprising a toe rest 132 which is depressed by the downward movement of the shoe and has a forward upper-pulling movement relatively to the last during such downward movement. The toe rest 132 has a depending hollow stem 134 slidably mounted in a holder 136, this holder being mounted for swinging movement about a horizontal axis on pivot studs 138 in the casing 106. A spring 140 serves as a yielding support for the toe rest 132 within the holder 136. Supported in fixed position on the studs 138 is a bracket 142, this bracket having a rearward extension engaged by a rod 144 (Fig. 15) to hold it from turning on the studs. Fast on the bracket 142 is a cam 146, and in engagement with this cam is a roll 148 which is carried by the depending stem 134 of the toe rest and is arranged to engage a lug 149 at the upper end of the cam to limit upward movement of the toe rest. On the holder 136 is a forward extension having therein a spring plunger 150 which engages a lower face of the bracket 142 and acts to hold the toe rest with its roll 148 in engagement with the cam 146. It will be seen that when the toe rest 132 is depressed by downward movement of the shoe, the cam 146 acts on the roll 148 to swing the holder 136 about the pivot studs 138 and thus to impart to the toe rest a forward movement toward the toe end of the shoe. The toe rest is preferably provided on its upper face with a rubber pad for engagement with the shoe, and the toe rest thus serves in its forward movement, by frictional engagement with the upper, to work the upper forwardly on the last and thus to tighten it lengthwise as the member 124 is working it upwardly about the toe.

For gathering and laying the margin of the upper inwardly over the insole about the toe and for pressing the upper into position to adhere to the insole, there are provided toe-embracing wipers which, in the construction herein shown, comprise a pair of end wiper plates 152 having wiping edges curved to embrace the upper about the end of the toe and a pair of side wiper plates 154 which are arranged to act only at the sides of the toe. The wiper plates 152 are mounted for movements in a curved guideway 156 about an axis located centrally of the toe, the guideway 156 being formed in a wiper carrier 158 mounted for movement lengthwise of the shoe in the casing 106 which serves as a wiper support. The wiper plates 152 thus have advancing movement lengthwise of the shoe and closing movements laterally of the shoe. The side wiper plates 154, on the other hand, are mounted for swinging or closing movements laterally of the shoe without advancing movement, being pivotally mounted at 160 on the casing 106. It will be seen by reference to Fig. 16 that the wiper plates 154 have comparatively thin edges arranged to underlie the plates 152, so that the plates 152 in their operative movements advance over the upper or outer faces of the plates 154.

Advancing movement lengthwise of the shoe is imparted to the piped plates 152 by means of a crank arm 162 which is fast on a rock shaft 164 in the casing 106 and is provided with a roll 166 which engages the wiper carrier 158 in a recess formed in the latter. The rock shaft 164 is operated by mechanism more particularly hereinafter described, and in its operative movement serves through its crank arm 162 to advance the wiper carrier 158 and the wipers 152 lengthwise of the shoe. For imparting swinging or closing movements to these wipers there are provided operating members comprising gear sectors 168 which are pivotally mounted on the casing 106 and are connected by links 170 to the wipers 152. Each of the gear sectors 168 is engaged by a rack member 172 adjustably mounted on the end of a rod 174 which has thereon another rack member 176 engaged by a gear sector 178 on the rock shaft 164. It will thus be seen that in the movement of the rock shaft 164 to advance the end wipers 152 the gear sectors 168 also are operated by the rock shaft to impart closing movements to these wipers. Closing movements are at the same time imparted to the side wipers 154 by the gear sectors 168 by means of rolls 180 which are mounted on the gear sectors and engage the outer edges of the wiper members 154. It is considered desirable, for a purpose explained below, to continue the closing movements of the wipers 152 longer than their advancing movement, and to this end there is provided on the wiper carrier 158 a curved surface 181 which is concentric with the axis of the rock shaft 164 and is engaged by the roll 166 during the latter portion of the wiper-operating movement of the shaft 164, so that movement is no longer imparted to the wiper carrier while both pairs of wipers 152, 154 are still being closed inward laterally of the shoe. Opening movements are imparted to the wipers 154 by rolls (not shown) located at the points where the links 170 are connected to the wipers 152 and engaging upraised portions of the wipers 154.

Each of the rack members 176 is held on its rod 174 between a knurled head 182 on the end of the rod and a collar 184 which is fast on the rod. By means of the head 182 the rod 174 may be turned, and since it is threaded within the rack member 172 it thus serves to adjust the latter relatively to the member 176 and thereby to adjust the wiper plates laterally of the shoe. It will be understood that in this manner either pair of wiper plates 152 and 154 may be adjusted laterally of the shoe independently of the other pair.

It will be evident that the construction of the toe wiper mechanism above described serves to avoid undue bending of the margin of the upper lengthwise of the shoe at the sides of the toe in the overwiping operation, since the wiper members 154 which act at the sides of the toe move laterally of the shoe without any movement in the direction of its length, and since the closing movements of the wipers 152, 154 continue after the wipers 152 have ceased to advance lengthwise of the shoe. The margin of the upper is thus wiped inwardly at all points about the toe in directions substantially radial to the adjacent portions of the edge of the shoe bottom.

The casing 106 with the parts mounted thereon is adjustable about the axis of curvature of the guide members 104 to position the toe-lasting devices, and particularly the wipers, in proper relation to the shoe in accordance with the lengthwise slope of the bottom of the forepart of the shoe, so that the wipers will bear with substantially equal pressures upon different portions of the margin of the upper about the toe. For effecting this adjustment the slide 102 has mounted thereon a hand wheel 186 connected by beveled gearing to a screw 188 which is mounted in a bearing in the slide 102 and is threaded through the rod 144 previously mentioned as mounted in the casing 106. A spring-controlled retaining member 190 is arranged to engage teeth on the hub of the hand wheel 186 to hold the parts in adjusted position.

The toe-lasting mechanism is also adjustable toward or from the heel-lasting mechanism for shoes of different lengths, and to this end the slide 102 is connected to a screw 192 (Fig. 1) which is mounted on the frame of the machine and is turned by a hand wheel 194. For indicating the proper adjustment for shoes of different lengths the slide 102 is connected by a link 196 to a lever 198 the upper end of which is shaped to provide a pointer 200 arranged to traverse the arc-shaped edge of a plate 202 mounted on the frame of the machine. Adjustable in an arc-shaped slot in the plate 202 are a plurality of fingers 204 which may have size indications thereon, these fingers being held in adjusted position by clamping members not shown in detail. The indicating means may thus be calibrated by the operator in accordance with what is found to be the best positions of the toe-lasting mechanism for different sizes of shoes, and will thereafter indicate at a glance whether the mechanism is properly adjusted for any particular size.

For depressing the shoe to effect the up-wiping and the forward pulling of the upper at the toe end of the shoe in the manner above described, the machine is provided with means for engaging the insole at its toe and heel ends and for forcing the shoe, together with the heel band and the heel wipers, downwardly against the resistance of the spring 8. The depressor for the toe end of the shoe comprises a presser foot 206 adjustably mounted on an arm 208 which is adjustable lengthwise on a vertically movable post 210. The post 210 is mounted for turning movement also in bearings in the frame, and is connected at its lower end to a vertically movable slide 212. Turning movement of the post 210 is controlled by a cam 214 on the frame of the machine in engagement with a roll 216 mounted on an arm connected to the post, and by a spring 218 which is connected to the post and tends to turn it in the direction to hold the roll 216 in engagement with the cam. By this mechanism the arm 208 is swung to the rear when the post 210 is in its uppermost position and is swung forwardly to position the presser foot 206 over the shoe as the post is moved downwardly.

The depressor for the heel end of the shoe comprises a presser foot 220 which is carried by the arm 74 previously mentioned, this arm being mounted for swinging movement lengthwise of the shoe about a pivot stud 222 carried by a vertically movable slide 224. Initially the slide 224 is in its uppermost position and the arm 74 is swung to the right, as indicated in Fig. 1. As the slide 224 receives its downward movement, a cam 226 which is fast on the frame acts by engagement with a roll 228 on the arm 74 to swing the arm to the left and thus to carry the presser foot 220 into position over the shoe. In the construction shown the pivot stud 222 is mounted on a slide 230 which is adjustable lengthwise of the shoe by means of a screw 232 and is held in adjusted position by a clamping screw 234.

As previously stated, the heel wipers 78 are supported initially by the spring plungers 86 and 90 in a plane higher than their operating plane, and as the presser foot 220 is moved downwardly it serves as a gage to determine the relation of these wipers to the bottom face of the insole. To this end, the presser foot 220 is mounted on a holder 236 which has on its opposite sides arms 238, one of which is seen in Fig. 9, for engaging the wipers 78 in different locations and depressing them against the resistance of their spring plungers until the presser foot arrives in clamping engagement with the insole. The holder 236 is mounted on a member 240 to rock laterally of the shoe so as to equalize the pressures of the wipers at the opposite sides of the heel seat, and the member 240 is adjustable about an axis extending laterally of the shoe, the construction and arrangement of these various parts being substantially as shown and described in the Letters Patent hereinbefore mentioned.

Figure 5:
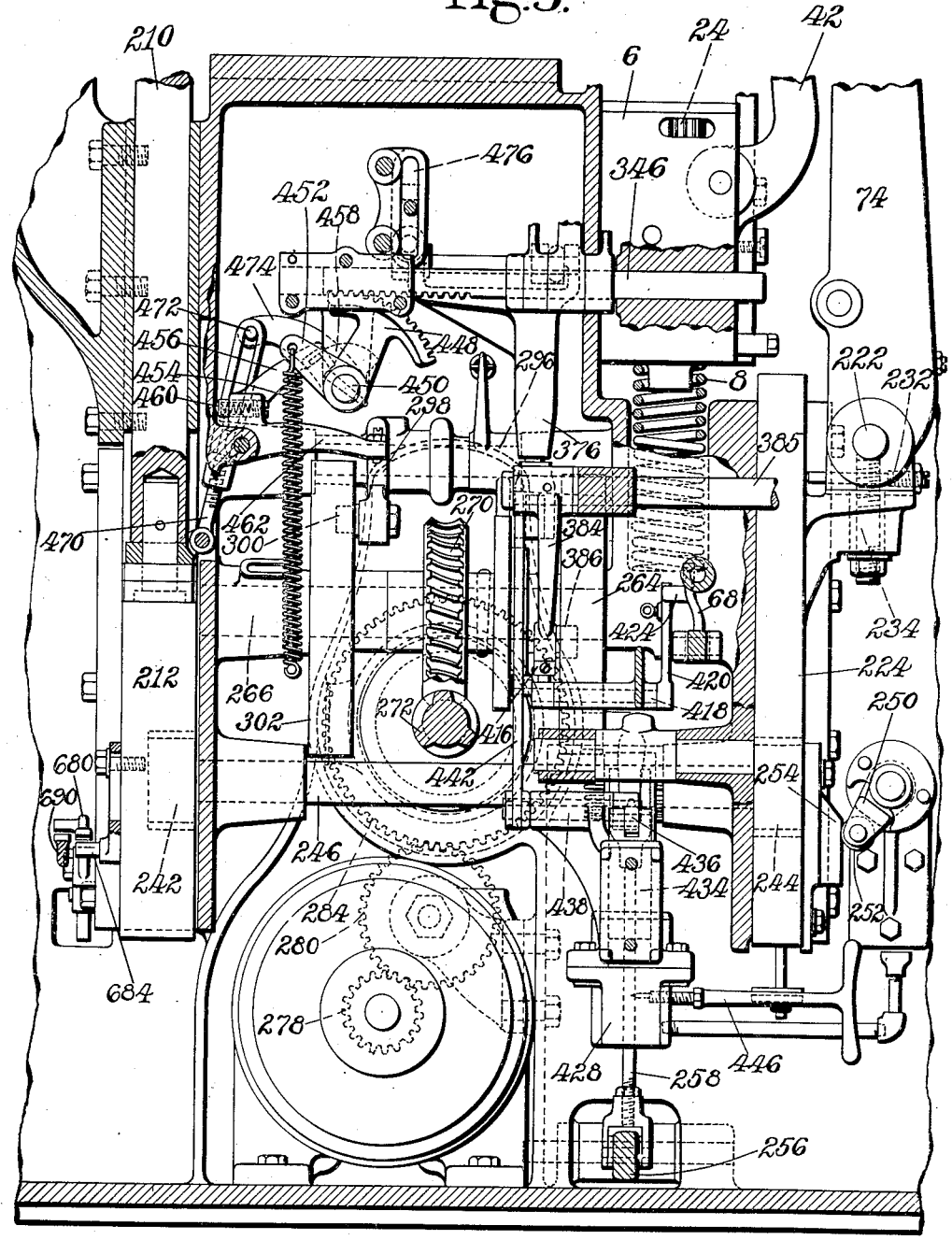
Fig. 5 is a view, partly in front elevation and partly in vertical section, of the lower portion of the machine.

The toe and heel presser feet 206 and 220 are arranged to be moved downwardly together, and to this end the slides 212 and 224 are provided with rack teeth engaged by pinions 242 and 244 on a shaft 246. The slides 212 and 224 are held initially in their uppermost positions by means of a torsion spring 248 (Fig. 4) connected to a crank arm 250 (Fig. 5) provided with a roll 252 arranged to engage the lower end face of a projection 254 on the slide 224 and thus to hold this slide and the connected slide 212 upraised. When the slides receive their downward movement, the arm 250 yields until the roll 252 engages the straight lateral face of the projection 254, as shown in Fig. 5, so that the spring 248 at that time opposes no resistance to downward movement of the slides. When the slides are moved upwardly again by their operating mechanism, the roll 252 again enters under the projection 254, completing the upward movement of the slides and then holding them in their uppermost positions.

As in the machine shown in the earlier Letters Patent, the machine herein shown is provided with means for moving the presser feet 206 and 220 into clamping engagement with the insole on the bottom of the last prior to the starting of the power operation of the machine. For this purpose the starting treadle 256 is connected by a link 258 to a gear sector 260 in engagement with a pinion 262 on the shaft 246 (Fig. 6), there being a lost motion connection between the upper end of the link 258 and the gear sector 260 to permit the latter to be subsequently operated by power. The power operation of the gear sector 260 to effect depression of the shoe is accomplished by a cam wheel 264 fast on a cam shaft 266, this cam wheel having in one side a cam groove arranged to act on a roll 268 on the gear sector. It will be understood that, as shown in the earlier Letters Patent, the cam groove is provided with an enlarged or open portion such as to permit the manual movement of the gear sector 260 in the manner above described.

The cam shaft 266 has fast thereon a worm gear 270 operated by a worm 272 on a power shaft 274 which is operated through a clutch from a source of power comprising, in the construction shown, an electric motor 276. This motor has a pinion 278 which engages and drives a pinion 280 on a shaft 282, and the pinion 280 engages and drives continuously a gear wheel 284 which is formed to serve as part of a clutch whereby power is transmitted to the shaft 274. The clutch includes a member 286 which turns with the shaft 274 and is slidable thereon between the member 284 and a brake member 288. The clutch member 286 is controlled by a lever 290 which is in turn controlled by the starting treadle 256 to start the machine and by stop cams $a$ and $b$ on the shaft 266 to stop the machine automatically at predetermined times. The clutch-controlling mechanism need not be further described in detail, since it is constructed substantially as shown and described in the earlier Letters Patent. It will be noted that the connection between the treadle 256 and other parts of the clutch-controlling means comprises a link 292 having in its lower end a slot whereby a lost motion connection is provided to permit such movement of the treadle 256 as is necessary to bring the presser feet into clamping engagement with the insole before the machine is started. In the construction herein shown, furthermore, the lever 290 has connected thereto a stop member 294 which may be turned into position to engage the frame of the machine and thereby prevent starting of the machine by depression of the treadle 256 if the operator so desires.

For operating the toe and heel wipers there is provided a rock shaft 296 having fast thereon a lever 298 (Fig. 5) provided with a roll 300 which lies in a cam groove formed in one side of a cam wheel 302 fast on the cam shaft 266. The shaft 296 is connected by beveled gearing 304 (Fig. 4) to a vertical shaft which is in turn connected by a universal joint to a telescopic shaft 306, the latter being connected by a universal joint to a shaft on the arm 74 provided with a beveled gear 308 (Fig. 9) in engagement with a similar gear 310 on a shaft 312 which is also mounted on the arm 74. The shaft 312 has thereon a crank arm 314 provided with a roll which lies in a slot 316 formed in a lever 318 which is pivoted on the arm 74 on the same axis as the roll 228. The lever 318 is thus operated by the crank arm 314, and is arranged to engage the rear end of the heel wiper slide 82 previously mentioned so as to advance the heel wipers and to cause them to close in response to the action of the pins 94. By means of a similar arrangement of operating mechanism not shown in detail, the shaft 296 is connected through beveled gearing 320 (Fig. 17) to the toe wiper operating rock shaft 164.

The machine herein shown is further provided with means for assisting the toe wipers in drawing and wiping the margin of the upper tightly inward over the insole, comprising a member 322 (Figs. 2, 3, 18 and 19) which may be termed a retarder and which is arranged to act also to position the marginal portion of the toe end of the insole close upon the bottom of the last preparatory to the overwiping operation. The member 322 is curved similarly to the edge of the toe end of the insole, and is supported upon the arm 208 by means of an arm 324 and links 326 and 328. The arm 324 extends lengthwise of the shoe and is forked at one end and connected to the member 322 by pivot studs 330 whereby the member 322 is permitted to tip lengthwise of the shoe to adjust itself to the plane of the insole. The links 326 and 328 are pivotally connected to the arm 324 at their lower ends, and at their upper ends are pivotally connected respectively to the arm 208 and to a plunger 332 which is mounted for vertical movement in the arm 208 against the resistance of a spring 334. It will be seen that the links 326 and 328 are so arranged that they swing the arm 324 and the member 322 downwardly toward the shoe, with a forward movement of the member 322 toward the toe wipers, a spring 336 being connected to the link 326 to hold the parts normally in an upraised position. For swinging the member 322 downwardly toward the shoe, there is connected to the link 326 a gear sector 338 engaged by a vertically movable rack bar 340 which is mounted on the arm 208 and is arranged to be carried downwardly into engagement with a cover plate 342 on the top of the toe wiper casing 106 when the arm 208 receives its downward movement. The member 322 is thus swung downwardly into engagement with the insole after the toe presser foot has been moved to clamping position and during depression of the shoe, the member receiving a forward wiping movement over the insole into position to clamp the margin of the insole yieldingly upon the bottom face of the last preparatory to the operation of the toe wipers, thus insuring that the toe end portion of the insole will be smooth on the bottom of the last. It will be understood that as the member 322 is thus carried to operative position the spring plunger 332 yields upwardly more or less in response to resistance of the shoe, and that the spring 334 thereafter acts through the plunger and the link 328 with downward pressure upon the arm 324. When the toe wipers are operated, as hereinbefore described, they wipe the margin of the upper inwardly against the member 322, as illustrated in Fig. 19, and this member thus acts as a retarder, increasing the frictional hold of the wipers upon the upper by bending the margin of the upper outwardly over the edges of the wipers, and at the same time assisting in regulating the formation of pleats in the overwiping operation. As the toe wipers continue their overwiping movement, the member 322 is lifted, against the resistance of the spring 334, in a direction substantially perpendicular to the bottom face of the insole, as illustrated in Fig. 19, permitting the wipers finally to wipe the upper inwardly beneath said member to complete the overwiping operation. To cause the member 322 thus to be lifted by the wipers, and also for bending the margin of the upper outwardly over the wipers, the member 322 is shaped to provide an upper-engaging face which flares or is inclined outwardly away from the insole so as to project over the edges of the wipers.

For lasting the sides of the shoe the machine is provided with opposite side-lasting mechanisms which are in many respects similar to the construction shown in the earlier Letters Patent and in other respects present novel features. Each of these mechanisms comprises a support or casing 344 mounted to swing toward and from the shoe on a rod 346 which is movable with the casing lengthwise of the shoe to shift the position of the side-lasting mechanism. Mounted to swing about the rod 346 in the casing 344 is an arm 348 which is arranged to control a plurality of sets of lasting devices, herein shown as four in number. Each of these sets of lasting devices comprises a strap 350 of flexible material, preferably leather, arranged to extend heightwise of the shoe and supported at its upper end by a lasting member or finger 352 which is carried by the arm 348 and extends transversely of the arm. For each of the straps 350 there is provided a side presser comprising an arm 354 pivotally mounted on the casing 344 to swing toward and from the shoe, this arm having pivotally mounted on its upper end a metal block 356 provided with an inner face curved similarly to the heightwise contour of the side of the shoe and arranged to bear upon the strap 350 to press it against the side of the shoe, the lower end portion of the strap being secured to this block. A spring plunger 358 tends to swing the upper end of the arm 354 and the block 356 toward the shoe with provision for yield as the strap 350 is pressed against the shoe.

Each of the lasting fingers 352 has a slot extending lengthwise thereof, and through the slots in the several fingers of each of the opposite side-lasting mechanisms extends a rod 360 by which the fingers are supported on the arm 348. Within the slot in each finger is a spring 362 which tends to force the finger inwardly over the shoe with provision for yield to permit movement of the arm 348 toward the shoe when further inward movement of the fingers 352 is prevented by resistance of the shoe. Each strap 350 is connected at its upper end to a slide 364 which is mounted in the finger 352 to move downwardly toward the bottom of the shoe against the resistance of a spring 366. Underlying each of the fingers 352 is a spring plunger 368 which tends to swing the inner end portion of the finger upwardly and thus to hold the strap 350 substantially taut. By the operation of mechanism hereinafter described each casing 344 and its arm 348 are operated to carry the straps 350 against the sides of the shoe, and by further movement of the arm 348 the several fingers 352 are forced inwardly over the bottom of the shoe while the straps are held pressed against the side of the shoe by the members 356. As the fingers 352 are thus forced inwardly, they swing downwardly toward the bottom of the shoe in response to the pull of the straps thereon, the springs 366 yielding more or less to permit the slides 364 to move downwardly toward the shoe in response to the pull of the straps. In this manner the margin of the upper is laid inwardly over the bottom of the insole and is pressed downwardly upon the insole.

Connecting the casings 344 of the opposite side-lasting mechanisms is a spring 370 which tends to swing the casings inwardly toward the shoe and against the resistance of which the casings are held initially in an outwardly swung position by the action of the arms 348 thereon. For controlling and operating the arms 348 there is provided a pair of toggle arms 372 which are pivotally connected to the arms 348 and are pivotally and slidingly mounted at their inner ends upon a rod 374. Supporting the rod 374 and pivotally mounted thereon is a hollow arm 376 within which is a spring 378 bearing upwardly against the lower face of a plunger 380 having a stem 382 which extends downwardly through the lower end of the arm 376. The stem 382 is connected at its lower end to one arm of a bell-crank lever 384 which is fast on a rock shaft 385 mounted on the frame of the machine and is provided with a roll 386 (Fig. 5) which lies in a cam groove 387 formed in one side of the cam wheel 264. It will be understood that when the bell-crank 384 is operated to pull downwardly on the plunger 380, the spring 370 is permitted to act to swing the opposite side-lasting mechanisms inwardly toward each other as far as permitted by resistance of the shoe, and thereafter additional swinging movements are imparted to the arms 348 by the action of the plunger 380 on the arm 376 and the toggle arms 372 through the yieldable spring connection 378.

After the lasting fingers 352 with their lasting straps 350 have been forced inwardly over the bottom of the shoe by the inward movements of the arms 348, and after the fingers have been swung downwardly toward the bottom of the shoe by the pull of the straps thereon, the fingers, in the construction herein shown, are further operated to increase their downward pressure on the bottom of the shoe and thus to insure that the margin of the upper will be pressed into position to adhere firmly to the insole. For this purpose there is mounted slidably on each of the arms 348 a rod or plunger 388 provided at its upper end with means for engaging the outer end portions of the several lasting fingers 352 on their lower faces and for thus swinging the fingers about the rod 360 to force their inner end portions downwardly toward the bottom of the shoe. This finger-engaging means comprises a device for substantially equalizing the pressures applied by the several lasting fingers, consisting of a rocker arm 390 (Fig. 7) which is pivotally mounted on the plunger 388 and is maintained normally in a centralized position by a spring plunger 392, and smaller rocker arms 394 pivotally mounted on the opposite ends of the arm 390 for engaging the fingers 352. A spring 396 on the plunger 388 serves, when permitted, to impart upward movement to the plunger for operating the lasting fingers. Initially the plunger 388 is held in a depressed position against the resistance of the spring 396 by means of a latch 398 which is mounted on the arm 348 for operative engagement with a notched collar 400 which is fast on the plunger 388, the latch 398 being maintained in operative position by a spring plunger 402. When the arm 348 has substantially completed its inward movement toward the shoe, the latch 398 is made to release or trip the plunger 388, thus permitting the spring 396 to act. For this purpose there is pivotally mounted at 404 on the casing 344 a latch-controlling member 406 provided with a pin 408 for engaging the latch 398. The member 406 is operated by a pin 410 on the arm 348, which projects within a slot formed in the member 406. For returning each plunger 388 into position to be held by its latch 398, the adjacent toggle arm 372 is extended beyond its pivotal connection with the arm 348 and is arranged to engage a collar 412 which is fast on the lower end of the plunger to force the plunger downwardly.

Before the opposite side-lasting mechanisms are operated as above described to lay the margin of the upper inwardly over the insole, they are utilized to wipe the upper upwardly at the sides of the shoe in the downward movement of the shoe, the straps 350 for this purpose being pressed against the shoe by the members 356. In shoes of the type illustrated the insole is not fastened to the bottom of the last, and it is desirable that the side-lasting mechanisms be moved inwardly against the sides of the shoe, preparatory to the upwiping operation, before the insole is clamped by the presser feet 206 and 220, in order to insure against possible lateral displacement of the last relatively to the insole by the movement of the side-lasting mechanisms inwardly against the shoe. The machine herein shown is accordingly provided with means for moving the side-lasting mechanisms into engagement with the shoe before the presser feet 206 and 220 are moved downwardly and before the machine is started in operation under power. To this end, the cam groove 387 which controls the bell-crank 384 and the side-lasting mechanisms is enlarged, as shown at c (Fig. 6), so as to permit the bell-crank 384 to move independently of its controlling cam. The construction is such that the roll 386 on the lever 384 lies in the enlarged portion c of the cam groove at the beginning of the cycle, so that the bell-crank may receive such movement as is necessary to permit the side-lasting mechanisms to move into engagement with the shoe before the machine is started. In order to hold the opposite side-lasting mechanisms in their outwardly swung positions independently of the cam groove 387, there is provided a lever 414 (Fig. 8) which acts as a latch in engagement with a plate 416 on the lower end of the bell-crank 384 to hold the bell-crank in position to maintain the side-lasting mechanisms at their outer limits of movement from the shoe. The lever 414 is fast on a rock shaft 418 upon which is also secured an arm 420 connected to a spring 422 which serves to hold the lever 414 in latching position. Movement of the lever 414 to release the bell-crank 384 is conveniently effected by the same plunger 66 which is utilized, as hereinbefore described, to trip the arm 42 and thereby to cause the heel band to be applied about the heel end of the shoe. For this purpose the bell-crank lever 68, which is operated by the plunger 66, is provided with a pin 424 for engaging the arm 420 to swing the lever 414 downwardly away from the plate 416. The construction is such that the movement of the plunger 66 acts first to release the arm 42, and by further or subsequent movement acts to release the side-lasting mechanisms, so that the operator is afforded the opportunity, after the upper has been clamped on the last at its heel end, to pull up the margin of the upper at the sides of the shank with his fingers preparatory to the inward movement of the side-lasting mechanisms to clamp the upper in this location. It will be understood that the cam groove 387 acts subsequently to return the bell-crank 384 into position to be held by the latching lever 414, with the side-lasting mechanisms swung outwardly away from the shoe. In order to prevent the bell-crank from being thus latched in the first outward swinging movement of the side-lasting mechanisms preparatory to their second operation on the shoe, as hereinafter more fully described, the lever 414 is further controlled by a cam 426 on the cam shaft 266 which acts to hold the lever in idle position until near the end of the cycle of operations of the machine, when it releases the lever and permits the latter to be moved upwardly into position to hold the bell-crank 384 again when the parts are finally returned to starting position.

In order further to guard against undesirable lateral displacement of the shoe by the inward movement of the side-lasting mechanism when the bell-crank 384 is released manually as above described, the machine is provided with means for retarding the inward movement of these mechanisms toward the shoe. By reference to Figs. 5 and 6 it will be seen that there is attached to the frame of the machine an oil reservoir 428 and a cylinder 430 which communicates with the reservoir when permitted by a check valve 432. In the cylinder 430 is a piston 434 connected to a crank arm 436 (Fig. 5) on a rock shaft 438, and fast on this rock shaft is another crank arm 440 connected by a link 442 to one of the arms of the bell-crank 384. Between the interior of the cylinder 430 and the reservoir 428 there is a restricted passage 444 controlled by a needle valve 446. When the opposite side-lasting mechanisms are swung outwardly from the shoe by the bell-crank 384, the piston 434 is moved upwardly and oil is drawn past the check valve 432 into the cylinder 430. When the bell-crank 384 is released by the action of the plunger 66 to permit the spring 370 to move the side-lasting mechanisms toward the shoe, the piston 434 is forced downwardly, and since the oil can escape from the cylinder only through the restricted passage 444, the movement of the side-lasting mechanisms toward the shoe is rendered gradual so that they do not come abruptly into contact with the shoe.

As in the machine shown in the earlier Letters Patent, the opposite side-lasting mechanisms are so constructed and operated as to last the sides of the shoe from the field of action of the heel-lasting mechanism to that of the toe-lasting machanism, operating first in the shank of the shoe and thereafter moving forwardly and operating again at the sides of the forepart of the shoe. The side-lasting mechanisms are moved forwardly to their second operating position by gear sectors 448, one of which is shown in Fig. 5, these gear sectors being arranged to engage rack teeth formed on the rods 346 that carry the side-lasting mechanisms. The gear sectors 448 are fast on a rock shaft 450 on which is an arm 452 connected to a spring 454 which acts, when permitted, to swing the gear sectors 448 and thus to impart forward movement to the side-lasting mechanisms. These mechanisms are retained in their first operating position by an arm 456 in engagement with a lug 458 on the rock shaft 450, the arm 456 being pivoted on the frame of the machine and normally held in operative position by a spring plunger 460. Mounted to swing with the arm 456 is an arm 462 which is in position to be engaged and lifted by the wiper-operating lever 298 near the end of its upward movement. It will thus be seen that the forward movement of the side-lasting mechanisms is made to take place substantially at the end of the operative movements of the toe and heel wipers. The forward movement of the side-lasting mechanisms is limited by engagement of lugs 464 (Fig. 1) on the casings 344 with rolls 466 which are mounted on plates 468 secured adjustably to the sides of the slide 102 which carries the toe-lasting mechanism. It will thus be seen that the limit of the forward movement of the side-lasting mechanisms is determined by the adjustment of the toe-lasting mechanism lengthwise of the shoe, so that the side-lasting mechanisms will be positioned in the same close proximity to the toe-lasting mechanism whatever may be the length of the shoe.

It will be understood that before the side-lasting mechanisms are thus advanced to their second operating position, they are swung outwardly from the shoe by the action of the cam groove 387, and that after they have been moved to their second position they are operated again in the same manner as in their first position to lay the margin of the upper over the insole and to press it forcibly down upon the bottom of the insole. The subsequent return of the side-lasting mechanisms to their first operating position is effected by the upward movement of the post 210 which carries a link 470 arranged to engage a pin 472 on an arm 474 which is fast on the rock shaft 450 and thus to turn the rock shaft into position for the lug 458 to be again held by the arm 456. It will be understood that, as the parts are shown in Fig. 5, the post 210 is in its lowermost position and the side-lasting mechanisms have not as yet been moved forwardly to their second position, and that to permit this forward movement the link 470 is provided with a slot, as shown, to provide for the necessary movement of the pin 472 when the forward movement of the lasting mechanisms takes place.

It will be understood that when the side-lasting mechanisms receive their positioning movement lengthwise of the shoe the toggle arms 372 have sliding movement along the rod 374. The machine is further provided with means for controlling the opposite side-lasting mechanisms to insure that when they are swung outwardly from the shoe they will be positioned at substantially equal distances from the shoe, this means including a centralizing cam 476 (Fig. 5) and other parts which are not shown in detail since they are constructed substantially as shown and described in the earlier Letters Patent.

When the shoe is depressed by the presser feet 206 and 220 it is moved to such a position as to insure against displacement of the margin of the insole by the inward movement of the toe wipers, a similar relation between the shoe and the heel wipers being determined by the relative arrangement of the wiper-depressing members 238 and the heel presser foot 220. After the toe wipers and the heel wipers have begun their operative movement to lay the margin of the upper over the insole, the shoe is moved upwardly toward the toe wipers to increase the pressure of these wipers upon the shoe during the remainder of their overwiping movement, and it is moved still farther upwardly to increase the pressure after the wipers have completed their overwiping movement. The shoe is thus moved upwardly by expansion of the supporting spring 8 and the toe rest spring 140, the presser feet 206 and 220 being lifted sufficiently to permit the springs to act. It will be understood that in this upward movement of the shoe the heel band, the heel wipers and the wiper-depressing members 238 all move upwardly with the shoe, and in order similarly to increase the pressure of the heel wipers upon the shoe it is necessary to change the relation between the heel presser foot 220 and the members 238. The presser foot 220 is accordingly mounted in its holder 236 for movement heightwise of the shoe relatively to the members 238, and it is controlled by toggle mechanism which is not shown in detail, since it is of the same construction as shown and described in the earlier Letters Patent. This toggle mechanism, as in the construction of the patent, is connected to a rod 478 having threaded adjustably thereon a member 480 which is arranged to be engaged by the upper end of the heel wiper operating arm 318. In this manner the heel presser foot 220 is released at a predetermined time relatively to the operation of the heel wipers, and this permits the shoe to be forced by the spring 8 farther upwardly and toward the heel wipers the height of which is determined by the members 238.

The machine herein shown is further provided with means for engaging the insole in the shank portion of the shoe and for thus holding the opposite side portions of the insole close to the bottom of the last until the side-lasting mechanisms have begun to lay the margin of the upper over the insole. As shown in Figs. 1, 9 and 11, there is pivotally mounted on the holder 236 an arm 482 upon one end of which there is mounted for rocking movement about a pivot stud 484 a holder 486 which supports at its opposite sides a plurality of resilient fingers 488 of spring metal arranged to extend divergently toward the insole and having their lower ends bent inwardly for engagement with the opposite side portions of the insole. By swinging movement of the arm 482 the holddown fingers 488 are moved either into operative position, as shown in Figs. 9 and 11, or into idle position, as shown in Fig. 1. The arm 482 is connected by a link 490 to a bell-crank 492 which is pivoted on the holder 236, and this bell-crank is connected by a link 494 to a bell-crank 496 which is mounted on the arm 74. Pivotally connected to one arm of the bell-crank 496 is the upper end of a tubular member 498 (Figs. 4 and 9) within which is a spring 500 which bears at its lower end upon a collar 502 fast on a rod 504 slidably movable lengthwise of the tubular member 498. The rod 504 at its lower end has a squared portion which is slidably movable in an opening provided in a bracket 506 on the frame of the machine and is formed with a lug 508 under which, as the parts are shown in Fig. 9, projects a plate 510 which is mounted for sliding movement horizontally on the bracket 506. The plate 510 is connected to a bell-crank 512 which is connected in turn by means of a link 514 to another bell-crank 516 (Fig. 4). A spring 518 is connected to the bell-crank 516 to hold the plate 510 in position under the lug 508, while permitting the plate to be withdrawn from under the lug by operative movement of the bell-crank 516.

It will be evident that, as the parts are shown in Fig. 9, the spring 500 is under compression and is acting upon the bell-crank 496 to maintain the holddown fingers 488 in engagement with the insole. When the plate 510 is withdrawn from beneath the lug 508, the spring 500 is permitted to expand, the rod 504 is thus moved downward, and the shank holddown fingers 488 are swung upwardly to the idle position in which they are shown in Fig. 1 by the action of a spring 520 connected to the bell-crank 496. This movement of the holddown device out of operative position is made to take place just after the opposite side-lasting mechanisms have begun to lay the margin of the upper inwardly over the insole in the power operation of the machine, the opposite fingers 488 yielding inwardly toward one another if engaged by the straps 350 before they have been withdrawn. For thus timing the withdrawal of the holddown device accurately in relation to the operative movement of the side-lasting mechanisms, there is utilized an arm 522 (Fig. 4) which is fast on the same rock shaft 385 which carries the bell-crank 384 for operating the side-lasting mechanisms, this arm being connected to a link 524 which is slidable through one of the arms of the bell-crank 516 and carries a nut 526 for engaging this arm of the bell-crank. It will be understood that this arrangement provides for lost motion between the link 524 and the bell-crank 516, so that in the first inward movement of the side-lasting mechanisms toward the shoe in response to operation of the plunger 66 the position of the latching plate 510 is not affected, the nut 526 acting upon the bell-crank 516 only at the beginning of the further movement of the side-lasting mechanisms under power. It will be understood that in the return of the parts of the machine to starting position, the arm 74 is moved upwardly and is swung to the right from the position in which it is shown in Fig. 9, and in this upward movement of the arm the rod 504 is carried again into position for its lug 508 to be supported by the plate 510, this plate being returned into operative position by the spring 518. When the downward movement of the arm 74 occurs in the operation of the machine upon the next shoe, downward movement of the rod 504 is thus prevented, so that the spring 500 is compressed and the holddown device is swung downwardly into clamping engagement with the insole, this operation being timed to take place after the arm 74 has been swung toward the shoe and has carried the presser foot 220 into engagement with the insole.

Before the shoe is presented to the machine it is desirable that the upper be pulled forwardly on the last by engaging it at its toe end, and that its toe portion be positioned in proper relation to the last. For this purpose the machine is provided with an upper-gripping and pulling device shown in Fig. 4. This device comprises opposite pairs of gripper jaws 528 which are mounted on a holder 530 for relative movement to grip the toe of an upper and are closed by a shoe rest member 532, this member being arranged to serve as a fulcrum about which the last is tipped to effect forward pulling of the upper. It is desirable that, in order to facilitate the removal of the shoe from the gripping device and its presentation to the lasting machine, the shoe be presented bottom upward while the upper is still held by the gripper, and to this end the holder 530 is mounted for turning movement about a horizontal axis in a bracket 534 which is fast on the frame of the machine, there being provided a clamp 535 for holding the last tipped with the upper under tension as the shoe is thus inverted. This upper-pulling device need not be further described in detail, since it is constructed substantially as shown and described in Letters Patent No. 1,737,012, granted upon my application on Nov. 26, 1929. In the construction herein shown, however, the turning movement of the upper-pulling and shoe-holding mechanism to bring the shoe into a position in which the last is bottom upward is effected by means of a treadle 536 connected by a link 538 to a rack member 540 which is vertically movable in the bracket 534 and engages a pinion 542 on the member 530 for turning the latter.

After the lasting of each shoe has been completed the shoe is automatically removed from the machine by mechanism shown in detail in Figs. 22 to 26, inclusive. This mechanism comprises a post 544 which is mounted for vertical movements and for turning movements in the frame of the machine and which has fast thereon a shoe carrier comprising an arm 546 provided at its outer end with means for alternately gripping or clamping and releasing a shoe. In operation the post 544 is turned to swing the shoe-gripping means into position over the shoe, and is then moved downwardly to cause said means to seize the shoe. Thereafter the post is moved upwardly to lift the shoe from the shoe support and is turned to carry the shoe into position over a chute 548 (Fig. 4), whereupon the shoe-gripping means is made to release the shoe to permit it to fall upon the chute and thence into a suitable receptacle.

The shoe-gripping means on the arm 546 comprises a rod 550 and a hollow plunger 552 which are mounted for sliding movements upwardly and downwardly in the arm and have fast thereon at their lower ends a cross-bar 554 upon which is mounted a plate 556 adapted to engage the heel seat face of the shoe, the plate being mounted for tipping movements about a stud 558 on the cross-bar. The plate 556 presses on the margin of the upper previously laid over the insole by the heel wipers, and thus serves further to insure that this portion of the margin of the upper will be pressed firmly into position to adhere to the insole. A spring 560 in the plunger 552 tends to move the plunger and the rod 550 downwardly in the arm 546 as far as permitted by a nut 562 on the rod, this spring thus permitting the arm 546 to continue its downward movement after the plate 556 has engaged the shoe.

Pivotally mounted on studs 564 on the opposite ends of the cross-bar 554 are shoe-gripping arms each comprising two members 566 and 568 which are movable together about the pivot studs 564 and may also move relatively to each other about the studs to a limited extent. Between each member 566 and the adjacent member 568 is a spring 570 which tends to swing these members apart, such relative swinging movement being limited by the interengagement of shoulders 572 on the different members. Each of the members 568 carries at its lower end a shoe-gripping or clamping plate 574 which is preferably faced with some soft material such as leather and is mounted for limited turning movement about a stud 576 on a member 578 which is mounted likewise for limited turning movement about a pivot stud 580 on the member 568 at right angles to the stud 576. A substantially universal connection is thus afforded between the plate 574 and the member 568 to permit the plate to adjust itself to the shape of the shoe.

Each of the members 566 is provided with a roll 582 for engagement with a wedge face 584 on the arm 546, and a spring 586 connected to the opposite members 566 tends to swing these members toward each other and thus to hold the shoe-clamping plates 574 in a widely separated relation when permitted by the wedge faces 584. It will be understood that in the continued downward movement of the arm 546, after the plate 556 has engaged the shoe, the wedge faces 584 act to swing the shoe-gripping arms 566, 568 about the studs 564 and thus to carry the clamping plates 574 into engagement with the opposite sides of the shoe, the springs 570 then being compressed to some extent so that the shoe is clamped or gripped yieldingly at its opposite sides. The force with which the shoe is thus gripped may be varied by means of adjusting screws 588 which regulate the compression of the springs 570. At the end of the downward movement of the arm 546 the plunger 552 is locked against downward movement relatively to the arm, so that when the arm is moved upwardly the parts of the shoe-gripping mechanism will remain in operative engagement with the shoe and the shoe will thus be carried upwardly with them. For this purpose there is mounted on the arm 546 a latch 590 which is arranged to enter a notch 592 in the side of the plunger 552. This latch is connected by a link 594 to a crank arm 596 on a rock shaft 598 in the arm 546, this rock shaft having fast thereon a lug 600 which is engaged by a spring 602 to cause the latch 590 to enter the notch 592. In order to cause the release of the shoe when the arm 546, after lifting the shoe, is swung to the rear, there are provided a fixed pin 604 (Fig. 4) on the machine and a co-operating arm 606 on the rock shaft 598. It will be evident that when the arm 606 engages the pin 604, further swinging movement of the arm 546 causes the latch 590 to release the plunger 552, whereupon the spring 560 expands, the cross-bar 554 and the shoe-gripping arms carried thereby are moved downwardly, and the arms are swung apart to release the shoe.

For imparting vertical movement to the post 544 there is provided a vertically movable rack bar 608 connected to the post by an arm 610 (Fig. 23) which is secured on the upper end of the rack bar and is forked at one end to embrace the post 544, the forked end of the arm being seated in a groove formed in a collar 612 which is fast on the post. The post 544 is thus moved upwardly and downwardly by the rack bar 608 and is also permitted to turn by reason of the character of its connection to the arm 610. The rack bar 608 is operated by a gear wheel 614 in engagement with teeth on the rack bar, this gear wheel being mounted to turn with a pinion 616 which is engaged and operated by a gear sector 618 on the upper end of a swinging arm 620. The arm 620 is provided with a roll 622 which lies in a cam groove 624 formed in one side of a cam wheel 626 on a shaft 628.

For imparting turning movement to the post 544 there is provided a rotatable shaft 630 having on its upper end a pinion 632 in engagement with a pinion 634 which is splined to the post 544 to permit the vertical movement of the post. Turning movement is imparted to the shaft 630 by means of a gear sector 636 in engagement with a pinion 638 on the lower end of the shaft, the gear sector 636 being formed on a swinging arm 640 provided with a roll 642 which lies in a cam groove 644 formed in the periphery of the cam wheel 626.

The shaft 628 is operated at a definite time relatively to the cycle of operations of the lasting mechanisms from a continuously rotated shaft 646 provided with a worm 648 in engagement with a worm gear 650 which is mounted to turn idly on the shaft 628, the shaft 646 having thereon a sprocket wheel 652 connected by a chain 654 to a sprocket wheel 656 (Fig. 6) on the continuously running shaft 282. The worm gear 650 is recessed and has therein a clutch ring 658 provided with a plurality of recesses 660 to receive the end of a spring-controlled pin 662 which is mounted in a hub 664 on the shaft and is controlled by a lever arm 666 in the well-known manner characteristic of clutches of the same general type. The arm 666 is mounted on a rock shaft 668 upon which is an arm 670 connected by a link 672 to a lever arm 674 connected to which is another arm 676 arranged to be engaged at its outer end by a pawl 678 which is pivotally mounted on the end of a lever 680. The pawl 678 is controlled by a spring plunger 682 which swings it outwardly into position over the end of the arm 676 when permitted by the movement of the lever 680. The lever 680 is controlled by the vertically movable slide 212 which is provided with a pin 684 for engagement with one end of the lever on the lower face of the latter. When the slide 212 receives its downward movement in the operation of the machine, as hereinbefore described, the lever 680 is swung by a spring 686 into position to permit the pawl 678 to swing outwardly over the end of the arm 676. When the slide 212 receives its upward movement in the return of the lasting mechanisms to idle position after their operation upon a shoe, the pin 684 swings the lever 680 in the opposite direction and thereby operates the clutch-controlling lever 666 to cause the shaft 628 to be clutched to the gear wheel 650. In this movement of the lever 680 the pawl 678 is finally carried downward past the end of the arm 676, so that the lever arm 666 is permitted to swing back again, under the influence of a spring 688, into position to disconnect the shaft 628 from the gear 650 at the end of a single revolution of the shaft.

In case it should be desired to render the shoe-removing mechanism inoperative when the lasting mechanisms are returned to starting position, so that the shoe will remain in the machine, there is provided a hand lever 690 which is pivoted on the frame of the machine with its inner end in position to engage a pin 692 on the lever 680. A spring 694 cooperating with a pin 696 on the lever 690 is arranged to hold the lever either in the idle position in which it is shown in Fig. 22, or in operative position in which it engages the pin 692 and thus prevents the lever 680 from swinging in response to the downward movement of the slide 212.

In the use of the machine the operator mounts an upper on a last and pulls the upper forwardly by the aid of the manually controlled gripper jaws 528, and thereafter turns the shoe and the gripper jaws by means of the treadle 536 to bring the shoe to a position in which the last is bottom upward. While holding the upper in its forwardly pulled condition, the operator then mounts the shoe on the heel pin 2, and while still holding the upper, presses on the plunger 66 to release the arm 42 and thereby cause the heel band to be applied about the heel end of the shoe, the pressure of the heel band on the shoe tipping the last forwardly so that the forepart of the upper is pressed downwardly upon the top of the toe rest 132. By further or subsequent movement of the plunger 66 the slide-lasting mechanisms are released to cause them to swing inwardly against the sides of the shoe at the shank. The operator next places an insole on the last in proper position, and then depresses the treadle 256 far enough to swing the toe and heel presser feet 206 and 220 over the shoe and to bring them down into clamping engagement with the insole.

Further movement of the starting treadle 256 serves to start the power operation of the machine, whereupon the presser feet are further operated to depress the shoe and its support, together with the heel band and heel wipers, the shank hold-down members 488 being swung down into operative position as the shoe is thus depressed. In this downward movement of the shoe the toe band 124 acts to wipe the upper upwardly about the toe and the toe rest 132 receives a forward movement to work the upper forwardly on the last. During the upwiping operation, moreover, the retarder 322 is moved into clamping engagement with the toe end of the insole, as illustrated in Fig. 18. It will be understood also that, as the shoe is moved downwardly, the opposite side-lasting mechanisms serve to wipe the upper upwardly at the sides of the shank of the shoe. At the end of the downward movement of the shoe the machine is brought to a stop by the action of the stop cam b, to afford the operator an opportunity to observe whether the different parts of the shoe are in proper position for the subsequent steps of the lasting operation.

When the machine is again started, the opposite side-lasting mechanisms are operated to lay the upper inwardly over the insole at the shank and to press its margin firmly down into position to adhere to the insole, the shank holddown device being tripped and withdrawn from operative position after these mechanisms have begun their inward movement over the insole. Near the end of this inward movement of the side-lasting mechanisms the toe wipers and the heel wipers are operated to lay the margin of the upper over the insole at the toe and heel ends of the shoe, the retarder 322 acting as illustrated in Fig. 19 in co-operation with the toe wipers. After the toe and heel wipers have begun to lay the margin of the upper inwardly over the insole, the presser feet 206 and 220 receive a short upward movement to permit the shoe to be forced upwardly by the springs 8 and 140 to increase the pressure of the toe wipers upon the upper. Substantially at the end of the overwiping operation a further upward movement of the presser feet causes the toe to be forced still more firmly up against the toe wipers. At substantially the same time, moreover, the mechanism controlling the heel presser foot 220 is operated by the action of the arm 318 on the rod 478 to release this presser foot and thereby to cause the shoe to be forced upwardly also toward the heel wipers for increasing the pressure of these wipers upon the upper.

After the side-lasting mechanisms have completed their operations in the shank portion of the shoe, they are swung outwardly from the shoe, and near the end of the operative movements of the toe and heel wipers these mechanisms are moved forwardly to positions adjacent to the toe-lasting mechanism and are operated again in this location in the same manner as in the shank. As the side-lasting mechanisms move inwardly against the sides of the shoe in their second operation on the shoe, the shoe is again depressed somewhat by the toe presser foot and by the arm 74 acting on the heel wipers, to cause an upwiping of the upper at the sides of the forepart by the action of the straps 350 of the side-lasting mechanisms, this depression of the shoe serving also to relax the pressure of the toe wipers on the upper preparatory to their withdrawal from over the shoe.

After the second operation of the side-lasting mechanisms on the shoe, the parts of the machine are returned to starting positions and the shoe is released. As the slide 212 is moved upwardly, the shoe-removing mechanism is started in operation, and acts in the manner described to grip the shoe and remove it from the shoe support and to drop it upon the chute 548.

It will be evident that shoe-removing mechanism such as herein shown is not limited to use in lasting machines, but is applicable to other machines utilized at various stages in shoe manufacture; and in claims relating to this mechanism the term "shoe" is accordingly used, except where the context requires a different interpretation, in a general rather than a restrictive sense as including a last with a part or parts of a shoe thereon, without reference to any particular stage in the manufacture of the shoe.

Having described the invention, what I claim as new and desire to secure by Letters Patent of the United States is:

1. In a machine of the class described, the combination with shoe-positioning means, of side-lasting mechanism comprising a plurality of flexible lasting straps arranged in a series along the side of the shoe and extending heightwise of the shoe, members arranged to act respectively through the different straps to lay the margin of the upper inwardly over the insole, and automatic spring means for imparting to said members movements heightwise of the shoe to press the margin of the upper upon the insole.

2. In a machine of the class described, the combination with shoe-positioning means, of side-lasting mechanism comprising a plurality of flexible lasting straps arranged in a series along the side of the shoe and extending heightwise of the shoe, members arranged to act respectively through the different straps to lay the margin of the upper inwardly over the insole, and spring means arranged to be tripped to impart to said members movements heightwise of the shoe to press the margin of the upper upon the insole.

3. In a machine of the class described, the combination with shoe-positioning means, of side lasting mechanism comprising a plurality of flexible lasting straps arranged in a series along the side of the shoe, members arranged to act respectively through the different straps to lay the margin of the upper inwardly over the insole, and means for imparting to said members movements heightwise of the shoe to press the margin of the upper upon the insole including mechanism for substantially equalizing the pressures applied by the different members.

4. In a machine of the class described, the combination with shoe-positioning means, of side-lasting mechanism comprising a plurality of flexible lasting straps arranged in a series along the side of the shoe, members arranged to act respectively through the different straps to lay the margin of the upper inwardly over the insole, said members being mounted for swinging movements heightwise of the shoe, and means for thus swinging said members at a predetermined time in the operation of the machine to press the margin of the upper upon the insole.

5. In a machine of the class described, the combination with shoe-positioning means, of side-lasting mechanism comprising a plurality of flexible lasting straps arranged in a series along the side of the shoe and extending heightwise of the shoe, members arranged to act respectively through the different straps to lay the margin of the upper inwardly over the insole, said members being mounted for swinging movements heightwise of the shoe, and spring means arranged to be tripped to swing said members for pressing the margin of the upper upon the insole.

6. In a machine of the class described, the combination with shoe-positioning means, of side-lasting mechanism comprising a plurality of flexible lasting straps arranged in a series along the side of the shoe and extending heightwise of the shoe, members arranged to act respectively through the different straps to lay the margin of the upper inwardly over the insole, said members being mounted for swinging movements heightwise of the shoe, and a device for engaging and swinging said members to press the margin of the upper upon the insole including mechanism for substantially equalizing the pressures applied by the different members.

7. In a machine of the class described, the combination with shoe-positioning means, of side-lasting mechanism comprising a plurality of flexible lasting straps arranged in a series along the side of the shoe, lasting fingers connected respectively to the different straps at one end of the latter for laying the margin of the upper inwardly over the insole, said fingers being arranged to extend outwardly from the shoe and fulcrumed between their ends for swinging movements heightwise of the shoe, and means arranged to act on the outer end portions of said fingers at a predetermined time with respect to their overlaying operation for swinging them to press the margin of the upper upon the insole.

8. In a machine of the class described, the combination with shoe-positioning means, of side-lasting mechanism comprising a plurality of flexible lasting straps arranged in a series along the side of the shoe and extending heightwise of the shoe, lasting fingers connected respectively to the different straps at one end of the latter for laying the margin of the upper inwardly over the insole, said of the upper inwardly over the insole, said fingers being arranged to extend outwardly from the shoe and fulcrumed between their ends for swinging movements heightwise of the shoe to press the margin of the upper upon the insole, and a spring-operated device for engaging the outer end portions of said fingers to impart swinging movements thereto including mechanism for substantially equalizing the pressures applied by the different fingers.

9. In the machine of the class described, the combination with shoe-positioning means, of side-lasting mechanism comprising a plurality of flexible lasting straps arranged in a series along the side of the shoe and extending heightwise of the shoe, lasting fingers connected respectively to the different straps for laying the margin of the upper inwardly over the insole, said fingers being movable from initial idle positions toward the bottom of the shoe independently of one another in response to the pull of the straps thereon, and means for imparting to said fingers independently of the straps movements toward the bottom of the shoe to press the margin of the upper upon the insole.

10. In a machine of the class described, the combination with shoe-positioning means, of side-lasting mechanism comprising a plurality of flexible lasting straps arranged in a series along the side of the shoe and extending heightwise of the shoe, members connected respectively to the different straps and movable laterally of the shoe to lay the margin of the upper inwardly over the insole, said members being mounted for movements heightwise of the shoe to press the margin of the upper upon the insole, and spring mechanism automatically operative in time relation to the movement of said members laterally of the shoe to impart to said members their upper-pressing movements.

11. In a machine of the class described, the combination with shoe-positioning means, of side-lasting mechanism comprising a plurality of flexible lasting straps arranged in a series along the side of the shoe and extending heightwise of the shoe, members connected respectively to the different straps and movable laterally of the shoe to lay the margin of the upper inwardly over the insole, said members being mounted for movements heightwise of the shoe to press the margin of the upper upon the insole, and spring means arranged to be tripped automatically in time relation to the movement of said members laterally of the shoe for imparting to said members their upper-pressing movements.

12. In a machine of the class described, the combination with shoe-positioning means, of side-lasting mechanism comprising a plurality of flexible lasting straps arranged in a series along the side of the shoe and extending heightwise of the shoe, lasting fingers connected respectively to the different straps for laying the margin of the upper inwardly over the insole, an arm movable laterally of the shoe and on which said fingers are fulcrumed between their ends, and means movable heightwise of the shoe for engaging the outer end portions of said fingers to swing them for pressing the margin of the upper upon the insole.

13. In a machine of the class described, the combination with shoe-positioning means, of side-lasting mechanism comprising a plurality of flexible lasting straps arranged in a series along the side of the shoe and extending heightwise of the shoe, lasting fingers connected respectively to the different straps for laying the margin of the upper inwardly over the insole, an arm movable laterally of the shoe and on which said fingers are mounted for movements heightwise of the shoe to press the margin of the upper upon the insole, and means carried by said arm and also movable heightwise of the shoe for imparting the upper-pressing movements to said fingers.

14. In a machine of the class described, the combination with shoe-positioning means, of side-lasting mechanism comprising a plurality of flexible lasting straps arranged in a series along the side of the shoe and extending heightwise of the shoe, lasting fingers connected respectively to the different straps for laying the margin of the upper inwardly over the insole, an arm movable laterally of the shoe and on which said fingers are mounted for swinging movements heightwise of the shoe to press the margin of the upper upon the insole, a spring-operated device carried by said arm for swinging said fingers, and mechanism automatically operative in the movement of said arm toward the shoe to release said spring-operated device.

15. In a machine of the class described, the combination with shoe-positioning means, of side-lasting mechanism comprising a plurality of flexible lasting straps arranged in a series along the side of the shoe and extending heightwise of the shoe, lasting fingers connected respectively to the different straps for laying the margin of the upper inwardly over the insole, an arm movable laterally of the shoe and on which said fingers are mounted for swinging movements heightwise of the shoe to press the margin of the upper upon the insole, a spring-operated device carried by said arm for swinging said fingers, a latch for holding said device in inoperative position, and mechanism operative in response to movement of said arm toward the shoe to move the latch into position to release said device and render it operative.

16. In a machine of the class described, the combination with shoe-positioning means, of side-lasting mechanism comprising a plurality of flexible lasting straps arranged in a series along the side of the shoe and extending heightwise of the shoe, lasting fingers connected respectively to the different straps for laying the margin of the upper inwardly over the insole, an arm movable laterally of the shoe and on which said fingers are mounted for swinging movements heightwise of the shoe to press the margin of the upper upon the insole, and a device carried by said arm for swinging said fingers, said device comprising an operating plunger and mechanism thereon for substantially equalizing the pressures applied by the different fingers.

17. In a machine of the class described, the combination with shoe-positioning means, of a flexible lasting strap arranged to extend heightwise of the shoe, a member supporting one end of said strap and movable to lay the margin of the upper inwardly over the insole and also to press the upper upon the insole, and automatic spring means for imparting upper-pressing movement to said member in time relation to its overlaying movement.

18. In a machine of the class described, the combination with shoe-positioning means, of a flexible strap arranged to extend heightwise of the shoe, a member supporting one end of said strap and movable to lay the margin of the upper inwardly over the insole, said member being mounted also for movement heightwise of the shoe to press the margin of the upper upon the insole, and spring means arranged to be tripped to impart the upper-pressing movement to said member.

19. In a machine of the class described, the combination with shoe-positioning means, of a flexible lasting strap, an arm movable toward the shoe, a finger carried by said arm and supporting one end of said strap for laying the margin of the upper inwardly over the insole, said finger being mounted on the arm for swinging movement heightwise of the shoe to press the margin of the upper upon the insole, and means including a spring carried by said arm for imparting the upper-pressing movement yieldingly to said finger in automatically determined time relation to the movement of the arm toward the shoe.

20. In a machine of the class described, the combination with shoe-positioning means, of a flexible lasting strap arranged to extend heightwise of the shoe, an arm movable toward the shoe, a finger carried by said arm and arranged to act through said strap to lay the margin of the upper inwardly over the insole, said finger being fulcrumed between its ends on said arm for swinging movement to press the margin of the upper upon the insole, and means on the arm arranged to be rendered operative in automatically determined time relation to the movement of the arm toward the shoe for engaging the outer end portion of said finger to impart thereto its upper-pressing movement.

21. In a machine of the class described, the combination with shoe-positioning means, of a flexible lasting strap arranged to extend heightwise of the shoe, a member connected to said strap and movable inwardly over the bottom of the shoe to lay the margin of the upper over the insole, said member being movable from an initial idle position toward the bottom of the shoe in response to pull of the strap thereon, and means for imparting to said member independently of the strap movement toward the bottom of the shoe to press the margin of the upper upon the insole.

22. In a machine of the class described, the combination with shoe-positioning means, of a flexible lasting strap arranged to extend heightwise of the shoe, a member connected to said strap and movable inwardly over the bottom of the shoe to lay the margin of the upper over the insole, said member being mounted to swing from an initial idle position toward the bottom of the shoe in response to pull of the strap thereon in the inward movement of the member, and mechanism automatically operative independently of the strap in time relation to the inward movement of said member to impart thereto swinging movement to press the margin of the upper upon the insole.

23. In a machine of the class described, the combination with shoe-positioning means, of a support movable laterally of the shoe, a flexible lasting strap carried by said support and arranged to extend heightwise of the shoe, and lasting members on said support connected respectively to the opposite ends of said strap, one of said members being yieldably mounted on the support and arranged to press upon the upper at the side of the shoe and the other of said members being arranged to lay the margin of the upper inwardly over the insole.

24. In a machine of the class described, the combination with shoe-positioning means, of a flexible lasting strap arranged to extend heightwise of the shoe, a member connected to said strap and movable inwardly over the bottom of the shoe to lay the margin of the upper over the insole, said member being mounted for movement also toward the bottom of the shoe in response to pull of the strap thereon, and spring means yieldably opposing the last-named movement of said member.

25. In a machine of the class described, the combination with shoe-positioning means, of a flexible lasting strap arranged to extend heightwise of the shoe, an arm movable toward the shoe, a lasting finger carried by said arm and connected to the lasting strap for laying the margin of the upper inwardly over the insole, said finger being mounted on the arm for swinging movement toward the bottom of the shoe to press the upper upon the insole, and spring means on said arm tending to swing said finger away from the bottom of the shoe.

26. In a machine of the class described, the combination with shoe-positioning means, of a flexible lasting strap arranged to extend heightwise of the shoe, means for controlling said strap including a member connected to one end thereof and movable to lay the margin of the upper inwardly over the insole, said member being mounted for movement toward the bottom of the shoe in response to pull of the strap thereon in the inward movement of the member, and spring means tending to move said member away from the bottom of the shoe and thereby to hold the strap taut during the inward movement of the member.

27. In a machine of the class described, the combination with shoe-positioning means, of a flexible lasting strap arranged to extend heightwise of the shoe, a member arranged to act through said strap to lay the margin of the upper over the insole, and a spring connection between said member and the strap yieldable in response to pull of the strap thereon.

28. In a machine of the class described, the combination with shoe-positioning means, of a flexible lasting strap arranged to extend heightwise of the shoe, a member movable inwardly over the bottom of the shoe and arranged to act through said strap to lay the margin of the upper over the insole, and a yielding connection between said member and the strap comprising a spring-controlled slide movable relatively to said member in response to pull of the strap thereon.

29. In a machine of the class described, the combination with shoe-positioning means, of a flexible lasting strap arranged to extend heightwise of the shoe, a lasting finger movable inwardly over the bottom of the shoe and arranged to act through said strap to lay the margin of the upper over the insole, said finger being yieldably movable toward the bottom of the shoe in response to pull of the strap thereon, and a spring-controlled slide mounted on said finger for movement relatively to the finger and to which said strap is connected.

30. In a machine of the class described, the combination with shoe-positioning means, of side-lasting mechanism comprising a plurality of flexible lasting straps arranged in a series along the side of the shoe and extending heightwise of the shoe, a plurality of lasting fingers movable inwardly over the bottom of the shoe and arranged to act respectively through the different straps to lay the margin of the upper over the insole, said fingers being movable independently of one another heightwise of the shoe in the overlaying operation, and spring connections between said fingers and straps independently yieldable in response to pull of the straps thereon.

31. In a machine of the class described, the combination with shoe-positioning means, of side-lasting mechanism comprising a plurality of lasting fingers arranged in a series along the side of the shoe and movable inwardly over the bottom of the shoe to lay the margin of the upper over the insole, said fingers being movable relatively to one another heightwise of the shoe to press the upper upon the insole, and mechanism arranged to be rendered operative at a predetermined time relatively to the inward movement of said fingers to impart upper-pressing movements to the fingers, said mechanism comprising means for substantially equalizing the pressures applied by the different fingers.

32. In a machine of the class described, the combination with shoe-positioning means, of side-lasting mechanism comprising a plurality of lasting fingers arranged in a series along the side of the shoe and movable inwardly over the bottom of the shoe to lay the margin of the upper over the insole, said fingers being movable relatively to one another heightwise of the shoe to press the upper upon the insole, and spring means arranged to be tripped to impart the upper-pressing movements to said fingers.

33. In a machine of the class described, the combination with shoe-positioning means, of side lasting mechanism comprising a plurality of lasting fingers arranged in a series along the side of the shoe and movable inwardly over the bottom of the shoe to lay the margin of the upper over the insole, said fingers being movable relatively to one another heightwise of the shoe to press the upper upon the insole, and spring-operated mechanism arranged to be tripped at a predetermined time relatively to the inward movement of said fingers to impart to the fingers their upper-pressing movements, said mechanism comprising a device for substantially equalizing the pressures applied by the different fingers.

34. In a machine of the class described, the combination with shoe-positioning means, of side-lasting mechanism comprising a plurality of lasting fingers arranged in a series along the side of the shoe for laying the margin of the upper inwardly over the insole, an arm supporting said fingers and movable laterally of the shoe to carry the fingers inwardly, the fingers being mounted on said arm for swinging movements relatively to one another heightwise of the shoe to press the upper upon the insole, spring means carried by said arm for imparting the upper-pressing movements to said fingers, and a device automatically operative at a predetermined time in the movement of the arm to release said spring means and render it operative.

35. In a machine of the class described, the combination with shoe-positioning means, of side-lasting mechanism comprising a plurality of lasting fingers arranged in a series along the side of the shoe for laying the margin of the upper inwardly over the insole, an arm supporting said fingers and movable laterally of the shoe to carry the fingers inwardly, the fingers being fulcrumed on said arm between their opposite ends for swinging movements heightwise of the shoe to press the upper upon the insole, spring-operated means carried by said arm for engaging the outer end portions of said fingers to impart to the fingers their swinging movements, and mechanism automatically operative at a predetermined time in the movement of the arm to release said spring-operated means and render it operative.

36. In a machine of the class described, the combination with shoe-positioning means, of side-lasting mechanism comprising a plurality of lasting fingers arranged in a series along the side of the shoe for laying the margin of the upper inwardly over the insole, an arm supporting said fingers and movable laterally of the shoe to carry the fingers inwardly, said fingers being mounted on the arm for swinging movements heightwise of the shoe to press the upper upon the insole, a spring-operated device carried by said arm for swinging said fingers, a latch for holding said device in inoperative position, and mechanism operative in response to movement of said arm to move said latch into position to release said device.

37. In a machine of the class described, the combination with shoe-positioning means, of opposite side-lasting mechanisms, power-operated means for effecting relative movement of said lasting mechanisms and the shoe to last the sides of the shoe, and manually controlled means for moving said lasting mechanisms into engagement with the sides of the shoe prior to the starting of the power operation of the machine and for holding them in engagement with the shoe independently of control of the operator.

38. In a machine of the class described, the combination with shoe-positioning means, of opposite side-lasting mechanisms, means for clamping an insole on the last and for effecting relative movement of said lasting mechanisms and the shoe to last the sides of the shoe, and means for moving said lasting mechanisms into engagement with the sides of the shoe prior to the clamping of the insole.

39. In a machine of the class described, the combination with shoe-positioning means, of opposite side-lasting mechanisms, power-operated means for effecting relative movement of said lasting mechanisms and the shoe to last the sides of the shoe, and manually controlled means for moving the side-lasting mechanisms into engagement with the sides of the shoe and for thereafter clamping a loose insole on the bottom of the last prior to the starting of the power operation of the machine.

40. In a machine of the class described, the combination with shoe-positioning means, of opposite side-lasting mechanisms comprising flexible lasting straps arranged to conform the upper to the sides of the last and to lay the margin of the upper inwardly over the insole, power-operated means for effecting relative movement of said lasting mechanisms and the shoe to last the sides of the shoe, and manually controlled means for moving said lasting mechanisms into engagement with the sides of the shoe prior to the starting of the power operation of the machine.

41. In a machine of the class described, the combination with shoe-positioning means, of opposite side-lasting mechanisms, means for clamping an insole on the last and for effecting relative movement of said lasting mechanisms and the shoe to last the sides of the shoe, spring means arranged to be tripped to move said lasting mechanisms into engagement with the sides of the shoe prior to the clamping of the insole, and means for retarding the movement of said lasting mechanisms toward the sides of the shoe.

42. In a machine of the class described, the combination with shoe-positioning means, of opposite side-lasting mechanisms, means for effecting relative movement of said lasting mechanisms and the shoe to last the sides of the shoe, spring means arranged to be tripped to move said lasting mechanisms into engagement with the sides of the shoe, and means for retarding the movement of said mechanisms toward the sides of the shoe.

43. In a machine of the class described, the combination with shoe-positioning means, of opposite side-lasting mechanisms, power-operated means for effecting relative movement of said lasting mechanisms and the shoe to last the sides of the shoe, spring means arranged to be tripped to move said lasting mechanisms into engagement with the sides of the shoe prior to the starting of the power operation of the machine, and fluid means for retarding the movement of said mechanisms toward the sides of the shoe.

44. In a machine of the class described, the combination with shoe-positioning means, of opposite side-lasting mechanisms, power-operated means for effecting relative movement of the shoe and said lasting mechanisms to last the sides of the shoe, a device for clamping the upper about the heel end of the last, and manually controlled means for moving said lasting mechanisms and clamping device into engagement with the shoe prior to the starting of the power operation of the machine.

45. In a machine of the class described, the combination with shoe-positioning means, of opposite side-lasting mechanisms, a device for clamping the upper about the heel end of the last, and spring means arranged to be tripped to move said lasting mechanisms and clamping device toward the shoe.

46. In a machine of the class described, the combination with shoe-positioning means, of opposite side-lasting mechanisms, a device for clamping the upper about the heel end of the last, spring means arranged to be tripped to move said lasting mechanisms and clamping device into engagement with the shoe, and means for retarding the movement of the lasting mechanisms toward the shoe.

47. In a machine of the class described, the combination with shoe-positioning means, of opposite side-lasting mechanisms, power-operated means for effecting relative movement of the shoe and said lasting mechanisms to last the sides of the shoe, a device for clamping the upper about the heel end of the last, and manually controlled means to cause said clamping device and lasting mechanisms to move successively into engagement with the shoe prior to the starting of the power operation of the machine.

48. In a machine of the class described, the combination with shoe-positioning means, of opposite side-lasting mechanisms, power-operated means for effecting relative movement of the shoe and said lasting mechanisms to last the sides of the shoe, a device for clamping the upper about the heel end of the last, spring means for moving said clamping device and lasting mechanisms toward the shoe, and controlling mechanism for releasing first the clamping device and then the lasting mechanisms to the action of said spring means prior to the starting of the power operation of the machine.

49. In a machine of the class described, the combination with shoe-positioning means, of opposite side-lasting mechanisms, a device for clamping the upper about the heel end of the last, spring means for moving said clamping device and lasting mechanisms toward the shoe, and a manually controlled member movable to release said clamping device to the action of the spring means and further movable to release said lasting mechanisms.

50. In a machine of the class described, the combination with shoe-positioning means, of heel-lasting mechanism, opposite side-lasting mechanisms, power-operated means for effecting relative movement of the shoe and said mechanisms to last the heel end and sides of the shoe, and manually controlled means for moving said heel and side lasting mechanisms toward the shoe, lengthwise and laterally of the shoe respectively, prior to the starting of the power operation of the machine.

51. In a machine of the class described, the combination with shoe-positioning means, of heel-lasting mechanism, opposite side-lasting mechanisms, power-operated means for effecting relative movement of the shoe and said mechanisms to last the heel and sides of the shoe, and spring means arranged to be tripped to move first the heel-lasting mechanism and then the side-lasting mechanisms toward the shoe prior to the starting of the power operation of the machine.

52. In a machine of the class described, the combination with a device for upwiping an upper about the toe of a last, and means for effecting relative movement of the last and said device to upwipe the upper, of a toe rest for engaging the upper frictionally on the top of the forepart, and mechanism automatically operative in the upwiping operation to impart to said toe rest movement toward the end of the toe to work the upper forwardly on the last.

53. In a machine of the class described, the combination with a shoe support, of means for upwiping the upper about the toe of the shoe, means for imparting to the shoe heightwise movement relatively to said upwiping means to effect the upwiping operation, a device arranged to engage the upper frictionally on the top of the forepart and mounted for movement with the shoe, and mechanism operative in response to movement of the shoe to impart to said device movement toward the end of the toe to work the upper forwardly on the last.

54. In a machine of the class described, the combination with a shoe support, of means for upwiping the upper about the toe of the shoe, means for imparting to the shoe heightwise movement relatively to said upwiping means to effect the upwiping operation, a toe rest arranged to engage the upper on the top of the forepart and yieldingly movable with the shoe, and a cam operative in response to the movement of the shoe to impart to said toe rest movement toward the end of the toe to work the upper forwardly on the last.

55. In a machine of the class described, the combination with a shoe support, of means for upwiping the upper about the toe of the shoe, means for imparting to the shoe heightwise movement relatively to said upwiping means to effect the upwiping operation, a toe rest arranged to engage the upper frictionally on the top of the forepart and yieldingly movable with the shoe, said toe rest being mounted for swinging movement lengthwise of the shoe, and a cam operative in response to the movement of the shoe to swing said toe rest forwardly for pulling the upper lengthwise of the last.

56. In a machine of the class described, the combination with a shoe support and means for imparting to a shoe on said support movement in the direction of its height, of a device for engaging the upper frictionally on the top of the forepart, and mechanism operative in response to the movement of the shoe to move said device toward the toe end of the shoe for pulling the upper forwardly on the last.

57. In a machine of the class described, the combination with a shoe support and means for imparting to a shoe on said support movement in the direction of its height, of a toe rest arranged to engage the upper frictionally on the top of the forepart and yieldingly movable with the shoe, and a cam operative in response to the movement of the shoe to move said toe rest toward the toe end of the shoe for pulling the upper forwardly on the last.

58. In a machine of the class described, the combination with shoe-positioning means, of a device for upwiping the upper about the toe of the shoe, said device comprising a toe band, means for supporting said toe band substantially against yield heightwise of the toe while permitting it to yield outwardly from the toe, and a rubber backing against the resistance of which the toe band is outwardly yieldable.

59. In a machine of the class described, the combination with shoe-positioning means, of a device for upwiping the upper about the toe of the shoe, said device comprising a toe band, a plurality of members arranged to support said toe band substantially against yield heightwise of the toe, said members being yieldable outwardly from the toe in response to wedging action of the shoe upon the toe band, and a rubber backing for said members against which they are outwardly yieldable.

60. In a machine of the class described, the combination with shoe-positioning means, of a device for upwiping the upper about the toe of the shoe, said device comprising a toe band, a plurality of spring metal members arranged to extend heightwise of the toe and supporting said toe band, and a rubber backing against which said members are yieldable outwardly from the toe.

61. In a machine of the class described, the combination with shoe-positioning means, of a toe band for upwiping the upper about the toe of the shoe, supports for the opposite halves of said toe band relatively adjustable laterally of the toe, members on each of said supports for holding the toe band substantially against yield heightwise of the toe, said members being yieldable outwardly from the toe in response to wedging action of the shoe on the toe band, and a rubber backing on said supports against which said members are outwardly yieldable.

62. In a machine of the class described, a flexible band for embracing and clamping an upper about an end of a last, a plurality of members for supporting said band substantially against yield heightwise of the shoe, said members being yieldable outwardly from the shoe in response to pressure of the shoe against the band, and a rubber backing against which said members are outwardly yieldable.

63. In a machine of the class described, the combination with shoe-positioning means, of a device for upwiping the upper about the toe of the shoe comprising a toe band yieldable outwardly in response to wedging action of the shoe thereon, said device being mounted for movement as a unit laterally of the shoe in response to pressure of the shoe against it to permit it to adjust itself to the position of the toe.

64. In a machine of the class described, the combination with shoe-positioning means, of a device for upwiping the upper about the toe of the shoe comprising a toe band yieldably outwardly in response to wedging action of the shoe thereon, and members supporting the opposite halves of said toe band and relatively adjustable laterally of the toe, said members and the toe band being mounted for movement as a unit laterally of the shoe in response to pressure of the shoe against the toe band to permit the upwiping device to adjust itself to the position of the toe.

65. In a machine of the class described, the combination with shoe-positioning means, of end-lasting wipers comprising wiper members mounted for movements lengthwise and laterally of an end of the shoe to gather and lay the upper inwardly about the end of the shoe, and additional wiper members movable laterally of the shoe at its opposite sides between said first-named members and the bottom of the shoe and relatively to which said first-named members are movable bodily lengthwise of the shoe in the lasting operation.

66. In a machine of the class described, the combination with shoe-positioning means, of end-lasting wipers comprising wiper members mounted for movements lengthwise and laterally of an end of the shoe to gather and lay the upper inwardly about the end of the shoe, and additional wiper members mounted for swinging movements laterally of the shoe without movement lengthwise of the shoe and arranged to operate at the sides of the shoe between said first-named wiper members and the bottom of the shoe.

67. In a machine of the class described, the combination with shoe-positioning means, of end-lasting wipers comprising wiper members arranged to operate at the sides of an end of the shoe and mounted for operative swinging movements about axes that are spaced apart laterally of the shoe, and other wiper members arranged to embrace the end of the shoe and to advance lengthwise of the shoe over the outer faces of said first-named members while swinging relatively to each other laterally of the shoe.

68. In a machine of the class described, the combination with shoe-positioning means, of a wiper support, a wiper carrier mounted on said support for movement lengthwise of the shoe, wiper members shaped to embrace an end of the shoe and mounted on said wiper carrier for swinging movements laterally of the shoe, and additional wiper members mounted on said wiper support for movements laterally of the shoe and arranged to operate upon the upper between said first-named wiper members and the bottom of the shoe.

69. In a machine of the class described, the combination with shoe-positioning means, of end-lasting wipers comprising end wiper members movable lengthwise and laterally of the shoe and side wiper members movable only in directions laterally of the shoe, and operating members at the opposite sides of said wipers having means for separately engaging the end wiper members and the side wiper members to move said members laterally of the shoe.

70. In a machine of the class described, the combination with shoe-positioning means, of end-lasting wipers comprising end wiper members movable lengthwise and laterally of the shoe and side wiper members movable only in directions laterally of the shoe, operating members mounted for turning movements at the opposite sides of said wipers, links connecting said operating members to the end wiper members, and means on said operating members for imparting operative movements also to the side wiper members.

71. In a machine of the class described, the combination with shoe-positioning means, of end-lasting wipers comprising, at each side of an end of the shoe, different wiper members mounted for operative swinging movements laterally of the shoe about axes extending heightwise of the shoe, and an operating member at each side of the wipers having means for separately engaging the different wiper members to operate them.

72. In a machine of the class described, the combination with shoe-positioning means, of end-lasting wipers comprising end wiper members movable lengthwise and laterally of the shoe and side wiper members movable only in directions laterally of the shoe, a rock shaft having means thereon for advancing the end wiper members lengthwise of the shoe, and devices connected to said rock shaft independently of the wiper-advancing means for imparting to the end wiper members and the side wiper members operative movements laterally of the shoe.

73. In a machine of the class described, the combination with shoe-positioning means, of a wiper support, a wiper carrier mounted on said support for movement lengthwise of the shoe, wiper members shaped to embrace an end of the shoe and mounted on said wiper carrier for swinging movements laterally of the shoe, additional wiper members mounted on said wiper support for movements laterally of the shoe and arranged to operate at the sides of the end of the shoe, a rock shaft having means thereon for advancing said wiper carrier, operating members having means for separately engaging the side wiper members and the end wiper members to move them laterally of the shoe, and gearing connections between the rock shaft and said operating members.

74. In a machine of the class described, the combination with shoe-positioning means, of end-lasting wipers comprising end wiper members movable lengthwise and laterally of the shoe and side wiper members movable only in directions laterally of the shoe, and operating means for moving the end wiper members lengthwise of the shoe and for moving both the end wiper members and the side wiper members laterally of the shoe, said operating means being constructed to continue the movements of the end and the side wiper members laterally of the shoe after the end wiper members have arrived at their limit of movement lengthwise of the shoe.

75. In a machine of the class described, the combination with shoe-positioning means, of end-lasting wipers curved to embrace an end of the shoe and mounted for advancing movement lengthwise of the shoe and for closing movement laterally of the shoe, and operating means for simultaneously advancing and closing said wipers constructed to continue their closing movement after they have arrived at the limit of their advancing movement.

76. In a machine of the class described, the combination with shoe-positioning means, of means for wiping the margin of the shoe upper inwardly over the bottom of the last, and a retarder arranged to be positioned in the path of the inward movement of said wiping means for increasing the pressure of said means upon the upper, said retarder being movable away from the bottom of the last in a path substantially perpendicular to the bottom face of the last in response to the inwardly directed pressure of the wiping means thereon.

77. In a machine of the class described, the combination with shoe-positioning means, of means for wiping the margin of the shoe upper inwardly over the bottom of the last, a retarder arranged to be positioned in the path of the inward movement of said wiping means for increasing the pressure of said means upon the upper, said retarder being movable away from the bottom of the last in a path substantially perpendicular to the bottom face of the last and having an upper-engaging face inclined outwardly from the bottom of the last to render the wiping means effective thus to move it in the overwiping operation, and spring means for yieldingly opposing the movement of the retarder away from the bottom of the last.

78. In a machine of the class described, the combination with shoe-positioning means, of means for wiping the margin of the shoe upper inwardly over an insole on the bottom of the last, and a member arranged to be positioned in engagement with the insole near its marginal edge to position the margin of the insole close to the bottom of the last, said member being formed to act as a retarder in engagement with the upper to increase the pressure of the wiping means upon the upper and movable away from the bottom of the insole in a path substantially perpendicular to the bottom face of the insole in response to the inwardly directed pressure of the wiping means thereon.

79. In a machine of the class described, the combination with shoe-positioning means, of means for wiping the margin of the shoe upper inwardly over an insole on the bottom of the last, a member arranged to be positioned in engagement with the insole near its marginal edge to position the margin of the insole close to the bottom of the last, said member being formed to act as a retarder in engagement with the upper for increasing the pressure of the wiping means upon the upper and having an upper-engaging face inclined outwardly from the bottom of the insole to render the wiping means effective to force the member away from the bottom of the insole in the overwiping operation, and spring means for yieldingly opposing the movement of the member away from the insole.

80. In a machine of the class described, the combination with shoe-positioning means, of end-lasting wipers for laying the margin of the upper inwardly over the insole about an end of the shoe, and a retarder comprising a member curved similarly to the edge of the end portion of the insole for engaging the margin of the upper in the path of the inward movement of the wipers to increase the pressure of the wipers upon the upper, said retarder being movable away from the bottom of the insole in a path substantially perpendicular to the bottom face of the insole in response to the inwardly directed pressure of the wipers thereon.

81. In a machine of the class described, the combination with shoe-positioning means, of end-lasting wipers for wiping the margin of the upper inwardly over the insole about an end of the shoe, a member curved similarly to the edge of the end portion of the insole for engaging the insole near its marginal edge to position the margin of the insole close to the bottom of the last, said member being arranged to serve as a retarder in engagement with the margin of the upper to increase the pressure of the wipers upon the upper and having an upper-engaging face inclined outwardly from the insole to render the wipers effective to force the member away from the bottom of the insole in the overwiping operation, and spring means for positioning said member in clamping engagement with the insole and against the resistance of which the member is movable away from the insole in response to the pressure of the wipers thereon.

82. In a machine of the class described, the combination with shoe-positioning means, of end-lasting wipers for laying the margin of the upper inwardly over the insole about an end of the shoe, a member formed to extend along the margin of the end portion of the insole for clamping the insole upon the bottom of the last and arranged to serve as a retarder in engagement with the margin of the upper to increase the pressure of the wipers upon the upper, said member being pivotally mounted to tip about an axis extending laterally of the shoe close to the insole to permit it to adjust itself to the plane of the insole and movable bodily away from the bottom of the insole in response to the pressure of the wipers thereon.

83. In a machine of the class described, the combination with shoe-positioning means, of end-lasting wipers for wiping the margin of the upper inwardly over the insole about an end of the shoe, a retarder for engaging the margin of the upper in the path of the inward movement of the wipers to increase the pressure of the wipers upon the upper, said retarder being so formed as to render the wipers effective to force it away from the bottom of the insole, and an arm supporting said retarder and extending lengthwise of the shoe, said arm being yieldingly movable to carry the retarder away from the bottom of the shoe in a direction substantially perpendicular to the bottom face of the insole in response to pressure of the wipers upon the retarder.

84. In a machine of the class described, the combination with shoe-positioning means, of end-lasting wipers for wiping the margin of the upper inwardly over the insole about an end of the shoe, a retarder for engaging the margin of the upper in the path of the inward movement of the wipers to increase the pressure of the wipers upon the upper, said retarder being so formed as to render the wipers effective to force it away from the bottom of the insole, an arm supporting said retarder and extending lengthwise of the shoe, links connected to said arm in different locations for swinging the arm toward the bottom of the shoe, and a yielding support for one of said links to permit the arm to be swung away from the bottom of the shoe by the pressure of the wipers on the retarder.

85. In a machine of the class described, the combination with shoe-positioning means, of end-lasting wipers for laying the margin of the upper inwardly over the insole about an end of the shoe, a presser foot for engaging the insole, a support for said presser foot movable to carry it into and out of operative position, and a retarder carried by said support for engaging the margin of the upper to increase the pressure of the wipers upon the upper, said retarder being movable away from the bottom of the insole in a path substantially perpendicular to the bottom face of the insole in response to the inwardly directed pressure of the wipers thereon.

86. In a machine of the class described, the combination with shoe-positioning means, of end-lasting wipers for wiping the margin of the upper inwardly over the insole about an end of the shoe, a presser foot for engaging the insole, a support for said presser foot movable to carry it into and out of operative position, and a member carried by said support for engaging the insole near its marginal edge to position the margin of the insole close to the bottom of the last, said member being arranged to serve as a retarder in engagement with the margin of the upper to increase the pressure of the wipers upon the upper and movable away from the bottom of the insole in a path substantially perpendicular to the bottom face of the insole in response to the inwardly directed pressure of the wipers thereon.

87. In a machine of the class described, the combination with shoe-positioning means, of end-lasting wipers for laying the margin of the upper inwardly over the insole about an end of the shoe, a presser foot for engaging the insole, a support for said presser foot movable to cause the presser foot to depress the shoe relatively to the wipers, a retarder carried by said support for engaging the margin of the upper to increase the pressure of the wipers upon the upper, and mechanism operative in response to the shoe-depressing movement of said support to impart to said retarder movement relatively to the support to bring it into operative position.

88. In a machine of the class described, the combination with shoe-positioning means, of end-lasting wipers for laying the margin of the upper inwardly over the insole about an end of the shoe, a presser foot for engaging the insole, a support for said presser foot movable to carry it into engagement with the insole, a member carried by said support for engaging the insole near its marginal edge to position the margin of the insole close to the bottom of the last, and means for imparting to said member movement relatively to the support to bring it into operative position after the presser foot has been moved into engagement with the insole.

89. In a machine of the class described, the combination with shoe-positioning means, of end-lasting wipers for wiping the margin of the upper inwardly over the insole about an end of the shoe, a presser foot for engaging the insole, a support for said presser foot movable to carry it into engagement with the insole and then to depress the shoe relatively to the wipers, a member carried by said support for engaging the insole near its marginal edge to position the margin of the insole close to the bottom of the last, said member being arranged to serve as a retarder in engagement with the margin of the upper to increase the pressure of the wipers upon the upper and having an upper-engaging face inclined outwardly from the insole to render the wipers effective to force the member away from the bottom of the insole, and mechanism operative in response to the shoe-depressing movement of said support to impart to said member movement relatively to the support to bring it into operative position, said mechanism including yieldable means arranged to permit the member to be forced away from the insole by the pressure of the wipers.

90. In a machine of the class described, the combination with shoe-positioning means, of end-lasting wipers for wiping the margin of the upper inwardly over the insole about an end of the shoe, a presser foot for engaging the insole, a movable support for said presser foot, a member on said support arranged to be positioned upon the bottom face of the insole and to serve as a retarder in engagement with the margin of the upper to increase the pressure of the wipers upon the upper, and mechanism on said support arranged to be rendered operative in response to movement of the support to impart to said member movement relatively to the support to bring it into operative position.

91. In a machine of the class described, the combination with shoe-positioning means, of end-lasting wipers for laying the margin of the upper inwardly over the insole about an end of the shoe, a member arranged to engage the insole about the end of the shoe to position the margin of the insole close to the bottom of the last, said member being formed to act as a retarder in engagement with the upper to increase the pressure of the wipers upon the upper in the overwiping operation, and automatic means for moving said member toward the bottom of the insole and outwardly toward the edges of the wipers in engagement with the bottom face of the insole to bring it into operative position.

92. In a machine of the class described, the combination with shoe-positioning means, of end-lasting wipers for wiping the margin of the upper inwardly over the insole about an end of the shoe, and a member arranged to be positioned on the bottom face of the insole to serve as a retarder in engagement with the upper to increase the pressure of the wipers upon the upper in the overwiping operation, said member being mounted for movement into operative position in a path inclined toward the bottom face of the insole and directed outwardly toward the edges of the wipers and movable out of operative position in a path substantially perpendicular to the bottom face of the insole.

93. In a machine of the class described, the combination with a support for a last having an upper and an insole thereon, of means for laying the margin of the upper inwardly over the insole, a member for engaging the bottom face of the insole, and automatic means for moving said member outwardly toward the edge of the insole in engagement with its bottom face to position the insole smoothly on the last, said member being displaceable thereafter from the margin of the insole by the action of the overlaying means.

94. In a machine of the class described, the combination with a support for a last having an upper and an insole thereon, of wipers for laying the margin of the toe end of the upper inwardly over the insole, a member for engaging the bottom face of the insole, and automatic means for moving said member lengthwise of the shoe toward the edge of the toe end of the insole in engagement with said bottom face to position the insole smoothly on the last, said member being displaceable thereafter from the bottom face of the insole by the action of the wipers thereon.

95. In a machine of the class described, the combination with a support for a last having an upper and an insole thereon, of toe-lasting wipers, means including a presser foot for engaging the insole to depress the shoe relatively to the wipers, a member carried by said shoe-depressing means for engaging the bottom face of the insole in a different location from said presser foot, and automatic means for imparting to said member movement relatively to the presser foot outwardly toward the edge of the insole in engagement with said bottom face to position the insole smoothly on the bottom of the last.

96. In a machine of the class described, the combination with shoe-positioning means, of opposite side-lasting mechanisms arranged to operate at the shank portion of the shoe, a device for positioning the shank portion of the insole close to the bottom of the last preparatory to the operation of said mechanisms, and automatic means for withdrawing said device from operative position in time relation to the operation of said mechanisms.

97. In a machine of the class described, the combination with shoe-positioning means, of opposite side-lasting mechanisms arranged to operate at the shank portion of the shoe, a device for positioning the shank portion of the insole close to the bottom of the last preparatory to the operation of said mechanisms, spring means for withdrawing said device from operative position, and mechanism automatically operative in time relation to said side-lasting mechanisms to release said spring means and render it operative.

98. In a machine of the class described, the combination with shoe-positioning means, of opposite side-lasting mechanisms arranged to operate at the shank portion of the shoe, a device for positioning the shank portion of the insole close to the bottom of the last preparatory to the operation of said mechanisms, and means automatically operative in time relation to the side-lasting mechanisms to withdraw said device from operative position after said mechanisms have begun to lay the upper over the margin of the insole.

99. In a machine of the class described, the combination with shoe-positioning means, of opposite side-lasting mechanisms, and a device for positioning the opposite side portions of the insole close to the bottom of the last at the shank of the shoe preparatory to the operation of said mechanisms, said device being mounted for swinging movement into and out of operative position about an axis extending laterally of the shoe.

100. In a machine of the class described, the combination with shoe-positioning means, of opposite side-lasting mechanisms, means for depressing the shoe relatively to said mechanisms, and a device carried by said shoe-depressing means and movable relatively thereto into or out of position to press the opposite sides of the shank portion of the insole close to the bottom of the last preparatory to the operation of said mechanisms.

101. In a machine of the class described, the combination with shoe-positioning means, of opposite side-lasting mechanisms arranged to operate at the shank portion of the shoe, a presser foot arranged to engage the heel end of the insole, a support for said presser foot, and a device mounted on said support for movement relatively thereto into and out of position to press the shank portion of the insole close to the bottom of the last.

102. In a machine of the class described, the combination with shoe-positioning means, of opposite side-lasting mechanisms, a presser foot for engaging the heel end of the insole, a support for said presser foot, means for moving said support to carry the presser foot to operative position, a device carried by said support and movable relatively thereto into or out of position to press the shank portion of the insole close to the bottom of the last, and automatic means for moving said device into operative position after the presser foot has been moved into operative position.

103. In a machine of the class described, the combination with shoe-positioning means, of opposite side-lasting mechanisms, a presser foot for engaging the heel end of the insole, a support for said presser foot movable to carry it into operative position, a device carried by said support for pressing the shank portion of the insole close to the bottom of the last, and automatic means for withdrawing said device from operative position while the presser foot remains in operative position.

104. In a machine of the class described, the combination with shoe-positioning means, of opposite side-lasting mechanisms, a presser foot for engaging the heel end of the insole, a support movable to carry said presser foot into operative position, a device carried by said support and movable relatively thereto into or out of position to press the shank portion of the insole close to the bottom of the last, and spring means arranged to be tripped to withdraw said device from operative position.

105. In a machine of the class described, the combination with shoe-positioning means, of opposite side-lasting mechanisms, and a device for pressing the opposite side portions of the insole close to the bottom of the last preparatory to the operation of said mechanisms, said device comprising opposite spring fingers shaped to extend divergently toward the insole in directions widthwise of the shoe and having their ends bent inwardly for clamping engagement with the insole.

106. In a machine of the class described, the combination with shoe-positioning means, of opposite side-lasting mechanisms, and a device for pressing the opposite side portions of the insole close to the bottom of the last preparatory to the operation of said mechanisms, said device comprising a holder and a plurality of spring fingers thereon arranged in a series at each side of the shoe, the opposite series of fingers extending divergently toward the insole in directions widthwise of the shoe and having their ends bent inwardly for clamping engagement with the insole.

107. In a machine of the class described, the combination with shoe-positioning means, of opposite side-lasting mechanisms, and a device for pressing the opposite side portions of the insole close to the bottom of the last preparatory to the operation of said mechanisms, said device comprising a plurality of fingers arranged in a series lengthwise of the shoe for engagement with the insole, and a holder for said fingers mounted for tipping movement about an axis extending laterally of the shoe in response to the pressure of the shoe against said fingers.

108. In a machine of the class described, the combination with shoe-positioning means, of side-lasting mechanisms movable to lay the margin of the upper inwardly over the insole at the opposite sides of the shank portion of the shoe, an insole-positioning device comprising members for pressing the opposite side portions of the insole close to the bottom of the last preparatory to the operation of said mechanisms, said members being yieldable inwardly over the insole in response to pressure of the side-lasting mechanisms thereon, and automatic means for withdrawing said members from engagement with the insole in time relation to the operation of said mechanisms.

109. In a machine of the class described, the combination with a shoe support and means for operating on a shoe on said support, of means for removing the shoe from said support and for discharging it from the machine after the machine has operated thereon.

110. In a machine of the class described, the combination with shoe-positioning means and mechanism for operating on a shoe positioned by said means, of automatic means for removing the shoe from the machine after the machine has operated thereon.

111. In a machine of the class described, the combination with means for operating on a shoe, of mechanism automatically operative after the operation of said means upon the shoe to grip the shoe and remove it from the machine.

112. In a machine of the class described, the combination with a shoe support and means for operating on a shoe on said support, of means for lifting the shoe from said support and for discharging it from the machine.

113. In a machine of the class described, the combination with means for operating on a shoe, of mechanism automatically operative to seize the shoe after the operation of said means thereon and to carry the shoe away from operating position.

114. In a machine of the class described, the combination with a shoe support and means for lasting a shoe on said support, of automatic means for removing the shoe from said support after the operation of the lasting means thereon.

115. In a machine of the class described, the combination with means for operating on a shoe, of shoe-removing mechanism constructed to carry the shoe away from operating position and then to release it.

116. In a machine of the class described, the combination with a shoe support and means for operating on a shoe on said support, of shoe-removing mechanism automatically operative to lift the shoe from said support and then to carry it to a different position and release it.

117. In a machine of the class described, the combination with a shoe support arranged to underlie a shoe and means for operating on a shoe on said support, of means for removing the shoe from said support comprising a carrier having thereon clamping members for engaging the opposite sides of the shoe.

118. In a machine of the class described, the combination with a shoe support and means for operating on a shoe on said support, of means for removing the shoe from said support comprising a carrier movable heightwise of the shoe and having thereon a member for engaging the bottom of the shoe and clamping members for engaging the opposite sides of the shoe, and mechanism operative in response to movement of the carrier after said first-named member has engaged the bottom of the shoe to move the side-clamping members into clamping position.

119. In a machine of the class described, the combination with a shoe support and means for operating on a shoe on said support, of means for removing the shoe from said support comprising a carrier movable toward the shoe and having shoe-clamping members thereon, and mechanism automatically operative in response to resistance of the shoe to the movement of said carrier to cause said clamping members to clamp the shoe.

120. In a machine of the class described, the combination with a shoe support and means for operating on a shoe on said support, of means for removing the shoe from said support comprising a carrier movable toward the shoe and having members mounted thereon for swinging movements to clamp the opposite sides of the shoe, said carrier including parts relatively movable in response to resistance of the shoe, and wedge mechanism operative in the relative movement of said parts to swing said clamping members into operative position.

121. In a machine of the class described, the combination with a shoe support and means for operating on a shoe on said support, of means for removing the shoe from said support comprising a carrier movable toward the shoe and having thereon arms mounted for swinging movements to clamp the opposite sides of the shoe, and automatic means for swinging said arms into operative position in response to the movement of the carrier, each of said arms comprising relatively movable members with a spring between them for applying clamping pressure yieldingly to the shoe.

122. In a machine of the class described, the combination with a shoe support and means for operating on a shoe on said support, of means for removing the shoe from said support comprising a carrier movable toward the shoe and having shoe-clamping members thereon, and automatic means for applying said clamping members to the shoe in response to the movement of the carrier toward the shoe and for locking said members in clamping position.

123. In a machine of the class described, the combination with a shoe support and means for operating on a shoe on said support, of means for removing the shoe from said support comprising a carrier movable toward the shoe and having thereon members for clamping the shoe at its opposite sides, said carrier comprising parts relatively movable in response to resistance of the shoe, mechanism operative in the relative movement of said parts to move said clamping members to clamping position, and a latch for automatically locking said parts against reverse relative movement to maintain the clamping members in clamping position during the removal of the shoe.

124. In a machine of the class described, the combination with a shoe support and means for operating on a shoe on said support, of means for removing the shoe from the shoe support comprising a carrier movable toward and from said support and having thereon automatic mechanism for clamping the shoe and for holding it as the carrier is moved away from said support.

125. In a machine of the class described, the combination with a shoe support and means for operating on a shoe on said support, of means for removing the shoe from said support comprising a carrier movable to carry the shoe to a different location, and means for causing said carrier to release the shoe.

126. In a machine of the class described, the combination with a shoe support and means for operating on a shoe on said support, of means for removing the shoe from said support comprising a carrier having means thereon for gripping the shoe and movable to carry the shoe to a different location, and mechanism operative in response to movement of the carrier to cause said gripping means to release the shoe.

127. In a machine of the class described, the combination with a shoe support and means for operating on a shoe on said support, of means for removing the shoe from said support comprising a carrier movable to carry the shoe to a different location and having thereon members for clamping the shoe at its opposite sides, a device on the carrier for holding said members in clamping position, and mechanism operative in response to movement of the carrier to cause said device to release said members.

128. In a machine of the class described, the combination with a shoe support and means for operating on a shoe on said support, of means for removing the shoe from said support comprising a carrier movable toward and from the shoe support and having thereon members for clamping the shoe at its opposite sides, mechanism automatically operative in the movement of the carrier toward the shoe support to cause said clamping members to clamp the shoe and to lock said members in clamping position, and mechanism automatically operative in the movement of the carrier away from the shoe support to cause said clamping members to release the shoe.

129. In a machine of the class described, the combination with a shoe support and means for operating on a shoe on said support, of means for removing the shoe from said support comprising a carrier movable toward and from the shoe support and having thereon means for clamping and holding the shoe, and mechanism automatically operative in time relation to the movements of the carrier to cause the clamping means to clamp the shoe and thereafter to release the shoe.

130. In a machine of the class described, the combination with a shoe support and means for operating on a shoe on said support, of means for removing the shoe from said support comprising a carrier mounted for reciprocatory movements to receive and lift the shoe and for swinging movement to carry the shoe to a different location.

131. In a machine of the class described, the combination with a shoe support and means for operating on a shoe on said support, of means for removing the shoe from said support comprising a carrier mounted for reciprocatory movements to receive and lift the shoe and for swinging movement to carry the shoe to a different location, and automatic means for imparting the different movements to said carrier in time relation to one another.

132. In a machine of the class described, the combination with a shoe support and means for operating on a shoe on said support, of means for removing the shoe from said support comprising a carrier and automatic means for moving it into a position over the shoe and then downwardly to receive the shoe and for thereafter moving it upwardly and to one side to carry the shoe to a different location.

133. In a machine of the class described, the combination with means for operating on a shoe, of mechanism for removing the shoe from the machine, a clutch for controlling said mechanism, and automatic means for actuating said clutch in time relation to the operation on the shoe.

134. In a machine of the class described, the combination with a shoe support and means for operating on a shoe on said support, of shoe-removing mechanism having an automatically determined series of movements to seize the shoe and remove it from said support and then to carry it to a different position and release it, and automatic means for starting said shoe-removing mechanism in operation in time relation to the operation on the shoe.

135. In a machine of the class described, the combination with shoe-positioning means and mechanism for operating on a shoe positioned by said means, of automatic means for removing each shoe from the machine after the machine has operated thereon, and a device enabling the operator at will to render said shoe-removing means inoperative without otherwise affecting the operation of the machine.

136. In a machine of the class described, the combination with a shoe support and power-driven means for operating on a shoe on said support, of power-driven mechanism arranged to be started in operation automatically at a predetermined time in the operation of the machine to remove the shoe from said support and discharge it from the machine, and a controlling device movable into position to render the shoe-removing mechanism inoperative in the operation of the machine on a plurality of shoes.

137. In a machine of the class described, the combination with a support for a last having an upper and an insole thereon, and means for laying the margin of the upper inwardly over the insole in position to adhere to the bottom face of the insole, of mechanism for removing the last and its shoe materials from said support including a member arranged to engage the margin of the upper and to press it upon the insole.

138. In a machine of the class described, the combination with a support for a last having an upper and an insole thereon, and wipers for laying the margin of the heel end portion of the upper inwardly over the insole in position to adhere to the bottom face of the insole, of mechanism for removing the last and its shoe materials from said support including a clamping member movable into engagement with the margin of the heel end of the upper after the wipers have operated thereon and arranged to press said margin upon the insole.

In testimony whereof I have signed my name to this specification.

BERNHARDT JORGENSEN.

CERTIFICATE OF CORRECTION.

Patent No. 1,775,225. Granted September 9, 1930, to

BERNHARDT JORGENSEN.

It is hereby certified that error appears in the printed specification of the above numbered patent requiring correction as follows: Page 1, line 20, after "flexible" insert the word lasting; and line 33, for "acting" read action; page 5, line 20, for the word "piped" read wiper; page 20, line 52, claim 51, after "heel" insert the word end; and that the said Letters Patent should be read with these corrections therein that the same may conform to the record of the case in the Patent Office.

Signed and sealed this 7th day of July, A. D. 1931.

(Seal)

M. J. Moore,
Acting Commissioner of Patents.